United States Patent
Aragaki et al.

(10) Patent No.: US 8,451,389 B2
(45) Date of Patent: May 28, 2013

(54) IMAGE PROCESSOR, IMAGE DISPLAY DEVICE, IMAGE PROCESSING METHOD, IMAGE DISPLAY METHOD, AND PROGRAM

(75) Inventors: Takumi Aragaki, Matsumoto (JP); Hiroshi Hasegawa, Chino (JP); Masashi Kanai, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/402,530

(22) Filed: Feb. 22, 2012

(65) Prior Publication Data

US 2012/0147029 A1    Jun. 14, 2012

Related U.S. Application Data

(63) Continuation of application No. 12/508,194, filed on Jul. 23, 2009, now Pat. No. 8,144,264.

(30) Foreign Application Priority Data

Aug. 1, 2008   (JP) ................. 2008-199365

(51) Int. Cl.
   *H04N 3/22* (2006.01)
   *H04N 3/26* (2006.01)
   *H04N 3/223* (2006.01)
(52) U.S. Cl.
   USPC .......................... 348/745; 348/747; 348/806
(58) Field of Classification Search
   USPC ................. 348/744–747, 806, 807, 607, 624,
          348/625, 630; 353/69, 101; 345/55, 613,
          345/589, 77, 56; 382/167, 162, 254, 275
   IPC .................... H04N 5/64,3/22, 3/26, 3/23, 3/223
   See application file for complete search history.

(56) References Cited

U.S. PATENT DOCUMENTS

| | | | |
|---|---|---|---|
| 6,411,290 | B1 | 6/2002 | Sasaki |
| 6,480,242 | B1 | 11/2002 | Okada et al. |
| 6,989,872 | B2 | 1/2006 | Nakatsuji et al. |
| 7,431,462 | B2 | 10/2008 | Inazumi |
| 7,456,846 | B1 | 11/2008 | King et al. |

(Continued)

FOREIGN PATENT DOCUMENTS

| | | |
|---|---|---|
| CN | 1250999 A | 4/2000 |
| JP | A-61-150487 | 7/1986 |

(Continued)

OTHER PUBLICATIONS

Nov. 28, 2011 Notice of Allowance issued in U.S. Appl. No. 12/508,194.

(Continued)

*Primary Examiner* — Sherrie Hsia
(74) *Attorney, Agent, or Firm* — Oliff & Berridge, PLC

(57) ABSTRACT

An image processor that corrects image signals corresponding to sub-pixels which form one pixel includes: a shift amount storage section that stores shift amounts of display positions of display sub-pixels corresponding to the sub-pixels which form a display pixel with respect to a predetermined reference position within a display image; and an image signal correcting section that corrects image signals corresponding to sub-pixels, which form each pixel of an input image, on the basis of the shift amounts stored in the shift amount storage section. The image signal correcting section corrects image signals in which dummy image signals corresponding to dummy sub-pixels, which are provided outside sub-pixels in an endmost portion of the input image, are added to input image signals of the sub-pixels.

13 Claims, 20 Drawing Sheets

U.S. PATENT DOCUMENTS

| | | |
|---|---|---|
| 8,040,441 B2 | 10/2011 | Nishida et al. |
| 8,144,168 B2 | 3/2012 | Aragaki et al. |
| 2003/0090597 A1 | 5/2003 | Katoh et al. |
| 2006/0158545 A1 | 7/2006 | Hirai |
| 2007/0064995 A1 | 3/2007 | Oaki et al. |
| 2008/0094419 A1 | 4/2008 | Leigh et al. |
| 2009/0096903 A1 | 4/2009 | Kusaka |
| 2009/0245619 A1 | 10/2009 | Oaki et al. |
| 2010/0033405 A1 | 2/2010 | Aragaki et al. |
| 2010/0061215 A1 | 3/2010 | Sakaguchi et al. |

FOREIGN PATENT DOCUMENTS

| | | |
|---|---|---|
| JP | A-07-264615 | 10/1995 |
| JP | A-2001-076132 | 3/2001 |
| JP | A-2003-083907 | 3/2003 |
| JP | A-2003-167530 | 6/2003 |
| JP | A-2005-121978 | 5/2005 |
| JP | A-2006-174184 | 6/2006 |
| JP | A-2007-300461 | 11/2007 |
| JP | A-2008-147725 | 6/2008 |
| WO | WO 2005-117456 A1 | 12/2005 |

OTHER PUBLICATIONS

Aug. 22, 2012 Notice of Allowance issued in U.S. Appl. No. 13/402,511.

Apr. 5, 2012 Office Action issued in U.S. Appl. No. 13/402,511.

FIG. 11A

| $D_{00}$ | $D_{10}$ | $D_{20}$ | $D_{30}$ | $D_{40}$ | $D_{50}$ |
|---|---|---|---|---|---|
| $D_{01}$ | $D_{11}$ | $D_{21}$ | $D_{31}$ | $D_{41}$ | $D_{51}$ |
| $D_{02}$ | $D_{12}$ | $D_{22}$ | $D_{32}$ | $D_{42}$ | $D_{52}$ |
| $D_{03}$ | $D_{13}$ | $D_{23}$ | $D_{33}$ | $D_{43}$ | $D_{53}$ |

FIG. 11B

| 0 | 0 | 0 | 0 | 0 | 0 | 0 | 0 |
|---|---|---|---|---|---|---|---|
| 0 | $D_{00}$ | $D_{10}$ | $D_{20}$ | $D_{30}$ | $D_{40}$ | $D_{50}$ | 0 |
| 0 | $D_{01}$ | $D_{11}$ | $D_{21}$ | $D_{31}$ | $D_{41}$ | $D_{51}$ | 0 |
| 0 | $D_{02}$ | $D_{12}$ | $D_{22}$ | $D_{32}$ | $D_{42}$ | $D_{52}$ | 0 |
| 0 | $D_{03}$ | $D_{13}$ | $D_{23}$ | $D_{33}$ | $D_{43}$ | $D_{53}$ | 0 |
| 0 | 0 | 0 | 0 | 0 | 0 | 0 | 0 |

IMAGE PROCESSOR, IMAGE DISPLAY DEVICE, IMAGE PROCESSING METHOD, IMAGE DISPLAY METHOD, AND PROGRAM

CROSS-REFERENCE TO RELATED APPLICATIONS

This is a Continuation of U.S. patent application Ser. No. 12/508,194 filed Jul. 23, 2009, and claims priority to JP 2008-199365 filed in Japan on Aug. 1, 2008. The disclosures of the prior applications are hereby incorporated by reference herein in its entirety.

BACKGROUND

1. Technical Field

The present invention relates to an image processor, an image display device, an image processing method, an image display method, and a program.

2. Related Art

In recent years, high-performance image display devices, such as big-screen televisions or projectors, have come into wide use. In these image display devices, it is further important to improve the quality of a display image. Particularly for projectors as image display devices with high degree of freedom of installation, a demand for higher quality of a display image is becoming strong as the quality of the contents itself becomes high.

As an example of such a projector, a projector in which a transmissive matrix type liquid crystal display device is used as a light valve is disclosed in JP-A-61-150487. The projector includes a plurality of dichroic mirrors, divides light from a light source into three primary colors of R, G, and B by a plurality of dichroic mirrors, and makes each light transmitted through a liquid crystal display device and then projected onto a screen through a projection lens. At this time, the transmitted light of the liquid crystal display device is mixed by an optical unit, such as a mirror, such that two-dimensional pixel arrangements match each other.

In this kind of projector, the quality of a display image can be improved by performing image display by increasing the number of pixels of a matrix type liquid crystal display device so that light modulation based on an image signal corresponding to contents is performed, for example.

However, display positions of display sub-pixels corresponding to sub-pixels which form one pixel are shifted on a screen due to a chromatic aberration of an optical system of the projector, adjustment accuracy of a position adjustment unit for constituent components of the optical system, and the like. Accordingly, lowering of a sense of resolution or generation of a false color occurs, for example, in an edge portion or endmost portion of a display image on the screen, which causes deterioration of the quality of the display image.

The shift amounts of display positions of the display sub-pixels corresponding to sub-pixels were negligible when the number of display pixels was small. However, as the number of display pixels is increased, shift of the display positions becomes noticeable. In the coming years, deterioration of the image quality caused by shift of display positions of display sub-pixels on a screen tends to occur easily.

SUMMARY

An advantage of some aspects of the invention is that it provides an image processor, an image display device, an image processing method, an image display method, and a program capable of suppressing deterioration of the image quality of a display image caused by shift of display positions of display sub-pixels corresponding to sub-pixels which form one pixel.

An aspect of the invention is directed to an image processor that corrects image signals corresponding to sub-pixels which form one pixel including: a shift amount storage section that stores shift amounts of display positions of display sub-pixels corresponding to the sub-pixels which form a display pixel with respect to a predetermined reference position within a display image; and an image signal correcting section that corrects image signals corresponding to sub-pixels, which form each pixel of an input image, on the basis of the shift amounts stored in the shift amount storage section. The image signal correcting section corrects image signals in which dummy image signals corresponding to dummy sub-pixels, which are provided outside sub-pixels in an endmost portion of the input image, are added to input image signals of the sub-pixels.

In this case, since image signals corresponding to display sub-pixels which form a display pixel are corrected by using dummy image signals, generation of a false color or deterioration of a sense of resolution in an endmost portion or near the edge of the display image can be suppressed even if the display positions of the display sub-pixels are shifted from each other. Moreover, in this case, correction processing of sub-pixels can be performed without exception processing regardless of whether or not the corresponding image signals are image signals of sub-pixels corresponding to display sub-pixels which form a display pixel in the endmost portion. As a result, since the processing load can be significantly reduced, the correction processing can be performed at high speed.

Furthermore, in the image processor according to the aspect of the invention, a dummy image signal adding section that adds the dummy image signals to the input image signals may be further included, and the image signal correcting section may corrects image signals in which the dummy image signals are added to the input image signals by the dummy image signal adding section.

In this case, correction processing based on the shift amounts can be performed in a state where dummy image signals are added regardless of pixel values that the input image signals have. As a result, since correction processing of sub-pixels can be performed without exception processing regardless of whether or not the corresponding sub-pixels are sub-pixels corresponding to display sub-pixels which form an endmost portion of a display image, the processing load can be significantly reduced.

Furthermore, in the image processor according to the aspect of the invention, an endmost sub-pixel detecting section that detects whether or not the input image signals are image signals corresponding to sub-pixels in the endmost portion of the input image may be further included. The image signal correcting section may corrects image signals using the input image signals and the dummy image signals when it is detected that the input image signals are image signals corresponding to sub-pixels in the endmost portion of the input image and corrects image signals using the input image signals and image signals corresponding to surrounding sub-pixels of the sub-pixels when it is detected that the input image signals are not image signals corresponding to sub-pixels in the endmost portion of the input image.

In this case, it is detected whether or not input image signals are image signals of sub-pixels corresponding to display sub-pixels, which form a display pixel in an endmost portion of a display image, and the image signal correcting section corrects the image signals according to the detection result. Accordingly, it becomes unnecessary to secure a memory area which is needed by preparing image signals in which dummy image signals are added to input image signals.

Furthermore, in the image processor according to the aspect of the invention, the dummy image signals may have pixel values equal to or smaller than brightnesses of the sub-pixels in the endmost portion of the input image.

In this case, the brightnesses of display sub-pixels in an endmost portion of a display image can be lowered regardless of the brightnesses that image signals of sub-pixels corresponding to display sub-pixels which form a display pixel in the endmost portion of the display image have. As a result, since generation of a false color in the endmost portion is suppressed, deterioration of the image quality can be prevented.

Furthermore, in the image processor according to the aspect of the invention, the dummy image signals may have pixel values of lowest brightness.

In this case, in processing that does not depend on pixel values, the brightnesses of display sub-pixels in the endmost portion of the display image can be lowered as much as possible. As a result, since generation of a false color in the endmost portion is almost suppressed, deterioration of the image quality can be prevented.

Furthermore, in the image processor according to the aspect of the invention, a shift amount calculating section that calculates a shift amount at a corresponding sub-pixel position on the basis of the shift amounts stored in the shift amount storage section may be further included, and the image signal correcting section may corrects an image signal corresponding to the sub-pixel position on the basis of the shift amount calculated by the shift amount calculating section.

In this case, the storage capacity for shift amounts to be stored can be reduced.

Furthermore, in the image processor according to the aspect of the invention, when each pixel is formed by sub-pixels of R, G, and B components, the reference position may be a display position of a display sub-pixel corresponding to the G-component sub-pixel.

In this case, since it is not necessary to store the shift amounts of sub-pixels for every color component, the storage capacity of the shift amount storage section can be further reduced. Moreover, since image signals corresponding to display sub-pixels of other color components can be corrected with a display sub-pixel of a color component, which is easy to be recognized to human eyes, as a reference, deterioration of the image quality can be prevented.

In addition, another aspect of the invention is directed to an image display device that performs image display on the basis of image signals corresponding to sub-pixels which form one pixel including: the image processor described above; and an image display section that displays an image on the basis of image signals corresponding to the sub-pixels corrected by the image processor.

In this case, it is possible to provide an image display device capable of suppressing generation of a false color or deterioration of a sense of resolution in an edge or endmost portion of a display image without performing exception processing.

In addition, still another aspect of the invention is directed to an image display device that performs image display on the basis of image signals corresponding to sub-pixels which form one pixel including: an image signal correcting section that corrects the image signals corresponding to the sub-pixels according to shift amounts of display sub-pixels corresponding to the sub-pixels which form a display pixel; and an image display section that displays an image on the basis of image signals of the sub-pixels corrected by the image signal correcting section. The image display section displays an image such that a brightness of a display sub-pixel in an endmost portion of a display image is lower than a brightness designated by a pixel value of a sub-pixel corresponding to the display sub-pixel.

In this case, since generation of a false color in the endmost portion of the display image caused by shift of display positions of display sub-pixels is suppressed, deterioration of the image quality can be prevented.

In addition, still another aspect of the invention is directed to an image display device that performs image display on the basis of image signals corresponding to sub-pixels which form one pixel including: an image signal correcting section that corrects the image signals corresponding to the sub-pixels according to shift amounts of display sub-pixels corresponding to the sub-pixels which form a display pixel; and an image display section that displays an image on the basis of image signals of the sub-pixels corrected by the image signal correcting section. In sequentially performing monochrome display on the whole screen using image signals with the same pixel value for every color component corresponding to the sub-pixels, the image display section displays an image such that, for any one of the color components, a brightness of a display sub-pixel which forms a display pixel in an endmost portion of a display image is lower than a brightness of a display sub-pixel located at an inner side than the endmost portion.

In this case, since generation of a false color in the endmost portion of the display image caused by shift of display positions of display sub-pixels is suppressed, deterioration of the image quality can be prevented.

In addition, still another aspect of the invention is directed to an image processing method of correcting image signals corresponding to sub-pixels which form one pixel including: acquiring an image signal corresponding to an input image; and correcting image signals corresponding to the sub-pixels, which form each pixel of the input image, on the basis of shift amounts of display positions of display sub-pixels corresponding to the sub-pixels which form a display pixel. In the correcting image signals, the correction processing is performed on image signals in which dummy image signals corresponding to dummy sub-pixels, which are provided outside sub-pixels in an endmost portion of the input image, are added to input image signals of the sub-pixels.

In this case, since image signals corresponding to display sub-pixels which form a display pixel are corrected by using dummy image signals, generation of a false color or deterioration of a sense of resolution in an endmost portion or near the edge of the display image can be suppressed even if the display positions of the display sub-pixels are shifted from each other. Moreover, in this case, correction processing of sub-pixels can be performed without exception processing regardless of whether or not the corresponding image signals are image signals of sub-pixels corresponding to display sub-pixels which form a display pixel in the endmost portion. As a result, since the processing load can be significantly reduced, the correction processing can be performed at high speed.

Furthermore, in the image processing method according to the aspect of the invention, the dummy image signals may have pixel values equal to or smaller than brightnesses of the sub-pixels in the endmost portion of the input image.

In this case, in processing that does not depend on pixel values, the brightnesses of display sub-pixels in the endmost portion of the display image can be lowered as much as possible. As a result, since generation of a false color in the endmost portion is almost suppressed, deterioration of the image quality can be suppressed.

In addition, still another aspect of the invention is directed to an image display method of performing image display on the basis of image signals corresponding to sub-pixels which form one pixel including: acquiring an image signal corresponding to an input image; correcting image signals corresponding to the sub-pixels on the basis of shift amounts of display positions of display sub-pixels corresponding to the sub-pixels which form a display pixel; and displaying an image on the basis of image signals of the sub-pixels corrected in the correcting of image signals. In the displaying of the image, the image is displayed such that a brightness of a display sub-pixel in an endmost portion of the display image is lower than a brightness designated by a pixel value of a sub-pixel corresponding to the display sub-pixel.

In this case, since generation of a false color in the endmost portion of the display image caused by shift of display positions of display sub-pixels is suppressed, deterioration of the image quality can be prevented.

In addition, still another aspect of the invention is directed to an image display method of performing image display on the basis of image signals corresponding to sub-pixels which form one pixel including: correcting image signals corresponding to the sub-pixels according to shift amounts of display sub-pixels corresponding to the sub-pixels which form a display pixel; and displaying an image on the basis of image signals of the sub-pixels corrected in the correcting of image signals. In sequentially performing monochrome display on the whole screen using image signals with the same pixel value for every color component corresponding to the sub-pixels, the image is displayed such that, for any one of the color components, a brightness of a display sub-pixel which forms a display pixel in an endmost portion of a display image is lower than a brightness of a display sub-pixel located at an inner side than the endmost portion in the displaying of the image.

In this case, since generation of a false color in the endmost portion of the display image caused by shift of display positions of display sub-pixels is suppressed, deterioration of the image quality can be prevented.

BRIEF DESCRIPTION OF THE DRAWINGS

The invention will be described with reference to the accompanying drawings, wherein like numbers reference like elements.

FIGS. 11A and 11B are views for explaining dummy image signals.

DESCRIPTION OF EXEMPLARY EMBODIMENTS

Hereinafter, embodiments of the invention will be described in detail with reference to the accompanying drawings. In addition, the embodiments described below are not intended to limit the contents of the invention defined by the appended claims. In addition, all of the configurations described below are not necessarily essential components of the invention.

Hereinafter, a projector is described as an example of an image display device of the invention. However, the image display device of the invention is not limited to the projector. That is, since it is thought that deterioration of the image quality caused by shift of the display position of a display sub-pixel corresponding to a sub-pixel is a phenomenon which may occur not only in the projector but also in various image display devices, the image display device of the invention is not limited to the projector.

First Embodiment

Figure 1:
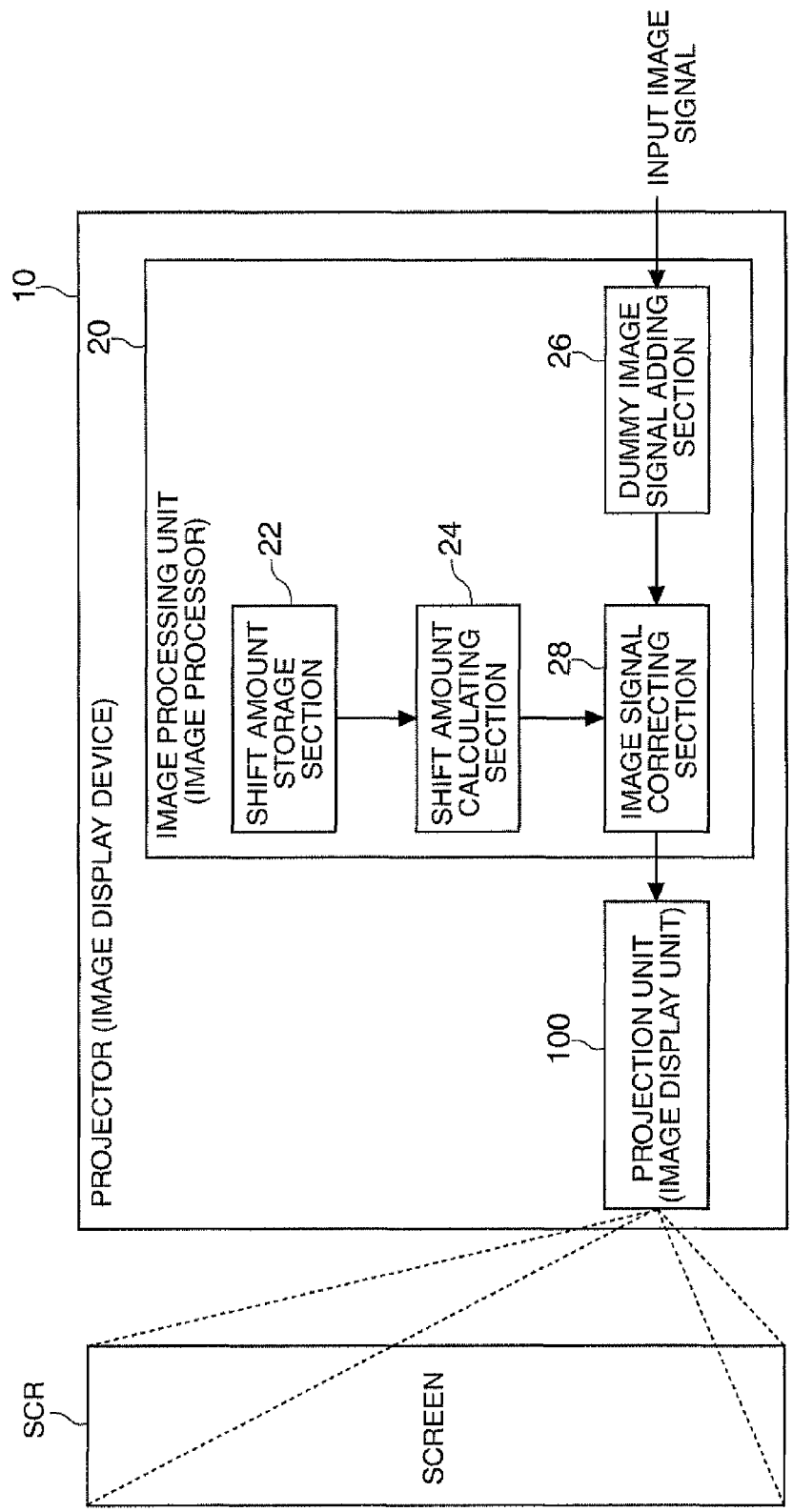
FIG. 1 is a block diagram illustrating an example of the configuration of a projector as an image display device according to a first embodiment of the invention.

FIG. 1 is a block diagram illustrating an example of the configuration of a projector as an image display device according to a first embodiment of the invention.

A projector 10 as an image display device according to the first embodiment performs image display by projecting light, which is modulated on the basis of image signals corresponding to a plurality of sub-pixels that form one pixel, onto a screen SCR. Here, a display pixel which forms a display image projected onto the screen SCR is formed by display sub-pixels corresponding to sub-pixels that form one pixel.

The projector 10 includes an image processing unit 20 as an image processor and a projection unit 100 as an image display unit.

The image processing unit 20 performs correction processing on an input image signal, which corresponds to a pixel value of each sub-pixel, according to shift amounts of display positions of display sub-pixels which form each display pixel of the display image projected onto the screen SCR. The input image signal is generated by an image signal generator (not shown) and is supplied to the image processing unit 20.

The image processing unit 20 may include a shift amount storage section 22, a shift amount calculating section 24, a dummy image signal adding section 26, and an image signal correcting section 28. The shift amount storage section 22 stores shift amounts (in a broad sense, correction parameters) of display positions of display sub-pixels corresponding to sub-pixels, which form a display pixel, using a predetermined reference position within a display image as a reference position. The shift amount calculating section 24 may calculate the shift amount of the sub-pixel position by interpolation processing using shift amounts of a plurality of display sub-pixels stored in the shift amount storage section 22 as representative points of one screen of a display image. Accordingly, the shift amount calculating section 24 may calculate the shift amounts of display sub-pixels for all pixels of one screen.

The dummy image signal adding section 26 adds dummy image signals corresponding to dummy sub-pixels, which are provided outside sub-pixels in an endmost portion of an input image, to input image signals of sub-pixels. The image signal to which the dummy image signal is added by the dummy image signal adding section 26 is supplied to the image signal correcting section 28. The image signal correcting section 28 performs correction processing of image signals, which correspond to sub-pixels that form each pixel of an input image, on the basis of the shift amounts calculated by the shift amount calculating section 24. That is, the image signal correcting section 28 performs correction processing on image signals in which dummy image signals corresponding to dummy sub-pixels, which are provided outside sub-pixels in an endmost portion of an input image, are added to input image signals of sub-pixels.

An image signal corrected by the image processing unit 20 is supplied to the projection unit 100. The projection unit 100 is formed by a three plate type liquid crystal projector, for example, and projects an image onto the screen SCR on the basis of image signals of sub-pixels which form one pixel. More specifically, the projection unit 100 modulates light from a light source (not shown) on the basis of the image signal corrected by the image processing unit 20 and performs projection onto the screen SCR using the modulated light.

Figure 2:
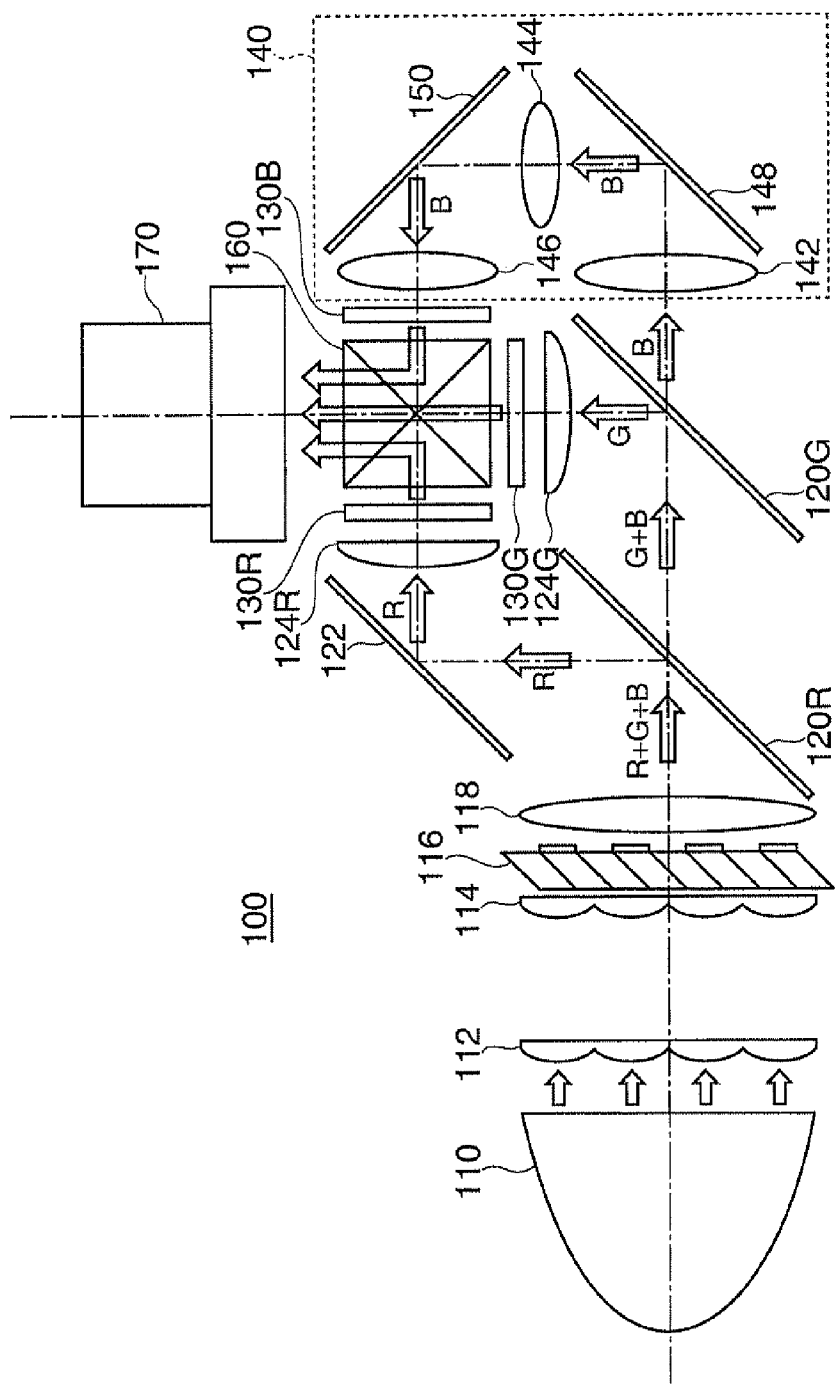
FIG. 2 is a view illustrating an example of the configuration of a projection unit of FIG. 1.

FIG. 2 shows an example of the configuration of the projection unit 100 of FIG. 1. In FIG. 2, an explanation is made assuming the projection unit 100 in the first embodiment is formed by a so-called three plate type liquid crystal projector. However, the projection unit of the image display device of the invention is not limited to being formed by the so-called three plate type liquid crystal projector.

The projection unit 100 includes a light source 110, integrator lenses 112 and 114, a polarization conversion element 116, a superposition lens 118, a dichroic mirror 120R for R, a dichroic mirror 120G for G, a reflecting mirror 122, a field lens 124R for R, a field lens 124G for G, a liquid crystal panel 130R (first light modulating section) for R, a liquid crystal panel 130G (second light modulating section) for G, a liquid crystal panel 130B (third light modulating section) for B, a relay optical system 140, a cross dichroic prism 160, and a projection lens 170. Liquid crystal panels used as the liquid crystal panel 130R for R, the liquid crystal panel 130G for G, and the liquid crystal panel 130B for B are transmissive liquid crystal display devices. The relay optical system 140 includes relay lenses 142, 144, and 146 and reflecting mirrors 148 and 150.

The light source 110 is formed by an ultrahigh-pressure mercury lamp, for example, and emits light including at least R-component light, G-component light, and B-component light. The integrator lens 112 has a plurality of small lenses for dividing light from the light source 110 into a plurality of partial light components. The integrator lens 114 has a plurality of small lenses corresponding to the plurality of small lenses of the integrator lens 112. The superposition lens 118 superimposes partial light components emitted from the plurality of small lenses of the integrator lens 112 on a liquid crystal panel.

In addition, the polarization conversion element 116 has a polarizing beam splitter array and a $\lambda/2$ plate and converts light from the light source 110 into approximately one kind of polarized light. The polarizing beam splitter array has a structure in which a polarized light separating film, which divides partial light components divided by the integrator lens 112 into p-polarized light and s-polarized light, and a reflecting film, which changes the direction of the light from the polarized light separating film, are alternately arrayed. Polarization directions of two kinds of polarized light components separated by the polarized light separating film are aligned by the $\lambda/2$ plate. The light converted into approximately one kind of polarized light by the polarization conversion element 116 is irradiated to the superposition lens 118.

The light from the superposition lens 118 is incident on the dichroic mirror 120R for R. The dichroic mirror 120R for R has a function of making R-component light reflected therefrom and G-component light and B-component light transmitted therethrough. Light transmitted through the dichroic mirror 120R for R is irradiated to the dichroic mirror 120G for G, and light reflected by the dichroic mirror 120R for R is reflected by the reflecting mirror 122 and is guided to the field lens 124R for R.

The dichroic mirror 120G for G has a function of making G-component light reflected therefrom and B-component light transmitted therethrough. Light transmitted through the dichroic mirror 120G for G is incident on the relay optical system 140, and light reflected by the dichroic mirror 120G for G is guided to the field lens 124G for G.

In the relay optical system 140, in order to make a difference between an optical path length of B-component light transmitted through the dichroic mirror 120G for G and an optical path length of the other R-component and G-component light as small as possible, the relay lenses 142, 144, and 146 are used to correct the difference of optical path lengths. Light transmitted through the relay lens 142 is guided to the relay lens 144 by the reflecting mirror 148. Light transmitted through the relay lens 144 is guided to the relay lens 146 by the reflecting mirror 150. Light transmitted through the relay lens 146 is irradiated to the liquid crystal panel 130B for B.

Light irradiated to the field lens 124R for R is converted into parallel beams to be incident on the liquid crystal panel 130R for R. The liquid crystal panel 130R for R functions as a light modulation element (light modulating section), and a transmittance (passing rate, modulation rate) thereof changes on the basis of an image signal for R. Therefore, light (light of a first color component) incident on the liquid crystal panel 130R for R is modulated on the basis of the image signal for R corrected by the image processing unit 20, and the modulated light is incident on the cross dichroic prism 160.

Light irradiated to the field lens 124G for G is converted into parallel beams to be incident on the liquid crystal panel 130G for G. The liquid crystal panel 130G for G functions as a light modulation element (light modulating section), and a transmittance (passing rate, modulation rate) thereof changes on the basis of an image signal for G. Therefore, light (light of a second color component) incident on the liquid crystal panel 130G for G is modulated on the basis of the image signal for G corrected by the image processing unit 20, and the modulated light is incident on the cross dichroic prism 160.

The liquid crystal panel 130B for B to which light converted into parallel beams by the relay lenses 142, 144, and 146 is irradiated functions as a light modulation element (light modulating section), and a transmittance (passing rate, modulation rate) thereof changes on the basis of an image signal for B. Therefore, light (light of a third color component) incident on the liquid crystal panel 130B for B is modulated on the basis of the image signal for B corrected by the image processing unit 20, and the modulated light is incident on the cross dichroic prism 160.

The liquid crystal panel 130R for R, the liquid crystal panel 130G for G, and the liquid crystal panel 130B for B have the same configuration. Each liquid crystal panel is formed by sealing liquid crystal, which is an electro-optical material, between a pair of transparent glass substrates. In each liquid crystal panel, the passing rate of each color light is modulated according to an image signal of each sub-pixel, for example, using a polysilicon thin film transistor as a switching element.

The cross dichroic prism 160 has a function of outputting mixed light, in which incident light from the liquid crystal panel 130R for R, the liquid crystal panel 130G for G, and the liquid crystal panel 130B for B are mixed, as emitted light. The projection lens 170 is a lens which forms an output image on the screen SCR in an enlarge manner and has a function of enlarging or reducing an image according to the zoom magnification.

Figure 3:
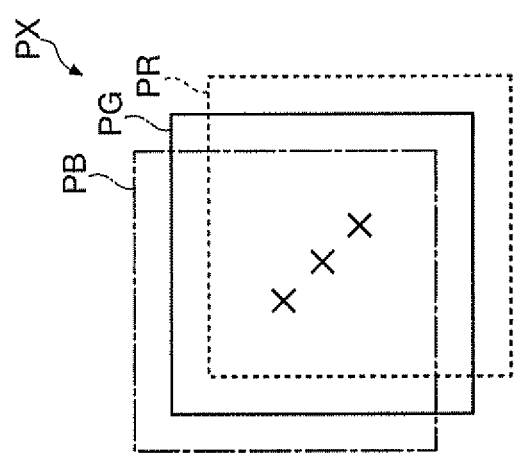
FIG. 3 is a view schematically illustrating a display pixel which forms a display image projected onto a screen by the projection unit of FIG. 2.

FIG. 3 is a view schematically illustrating a display pixel which forms a display image projected onto the screen SCR by the projection unit 100 of FIG. 2.

A display pixel PX which forms a display image projected onto the screen SCR has a bright spot, which is an image on the screen SCR of a pixel of a light modulation element (light modulating section) provided in the projector 10. The display pixel PX is matched with a pixel of the light modulating section. In addition, the projection unit 100 performs projection such that bright spots of display sub-pixels of an R-component display sub-pixel PR corresponding to a pixel of the liquid crystal panel 130R for R, a G-component display sub-pixel PG corresponding to a pixel of the liquid crystal panel 130G for G, and a B-component display sub-pixel PB corresponding to a pixel of the liquid crystal panel 130B for B overlap each other. Thus, the display pixel PX is formed by the display sub-pixels PR, PG, and PB.

However, the projection unit 100 has a configuration like FIG. 2. Accordingly, display positions of display sub-pixels are shifted on a screen due to a chromatic aberration of the optical system, adjustment accuracy of a position adjustment unit for constituent components of the optical system, and the like. Therefore, in the first embodiment, for example, using a display position of the G-component display sub-pixel PG which forms a display pixel as a reference position, a shift amount of the R-component display sub-pixel PR which forms the display pixel and a shift amount of the B-component display sub-pixel PB which forms the display pixel are stored. In addition, image signals of the sub-pixels are corrected on the basis of the shift amounts.

Accordingly, even if the display positions of display sub-pixels are shifted from each other, it is possible to suppress deterioration of the image quality of a display image by suppressing lowering of a sense of resolution or generation of a false color in an edge portion or endmost portion of the display image, for example.

In the projector 10 according to the first embodiment which has the above-described configuration, processing for acquiring shift amounts of sub-pixels is performed first. This acquisition processing is performed, for example, in an inspection process in manufacturing the projector 10.

Figure 4:
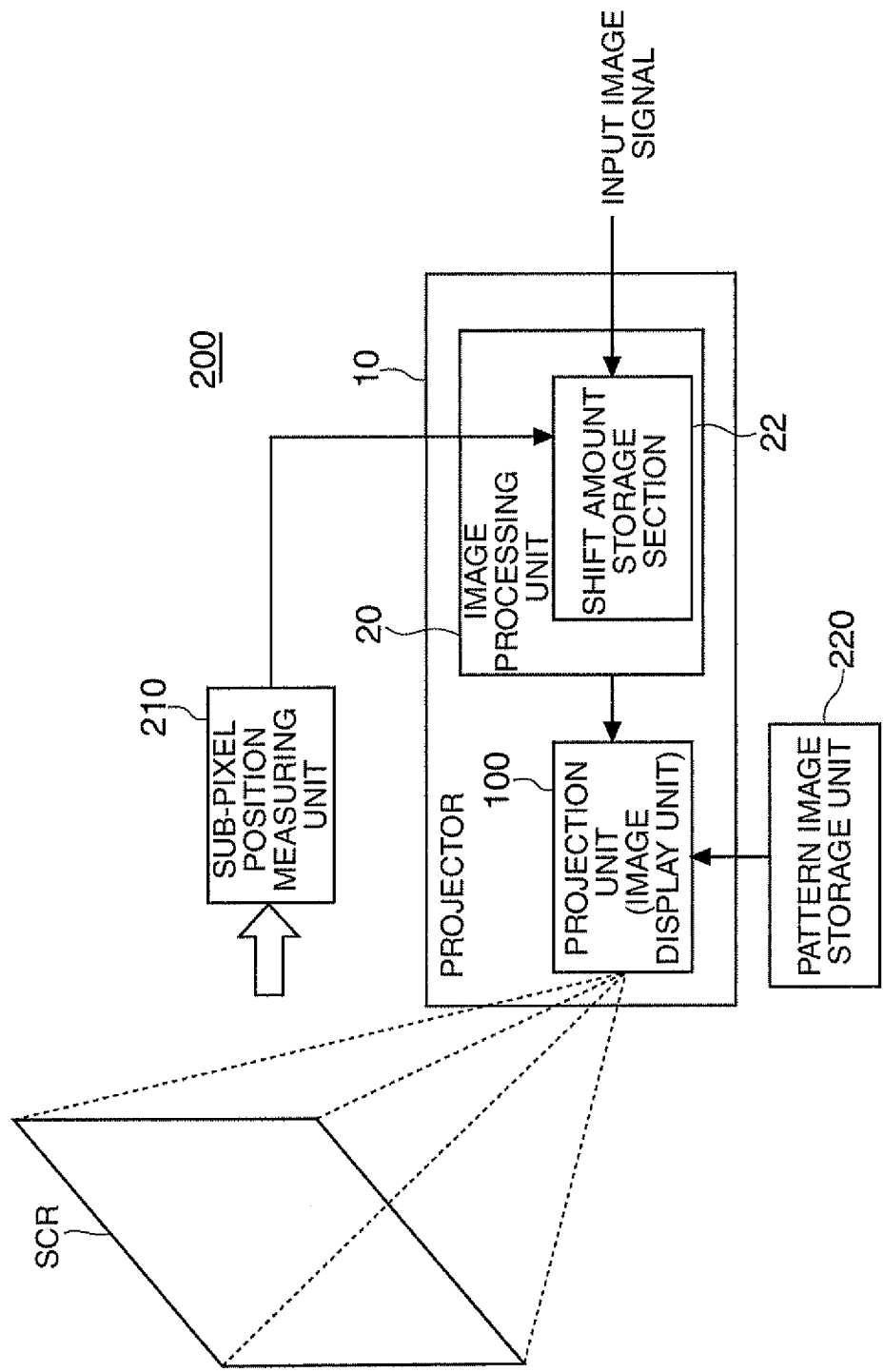
FIG. 4 is a block diagram illustrating an example of the configuration of a measurement system which measures the shift amount of a display sub-pixel position of the projector in the first embodiment.

FIG. 4 is a block diagram illustrating an example of the configuration of a measurement system which measures the shift amount of a display sub-pixel position of the projector 10 in the first embodiment. In FIG. 4, the same portions as in FIG. 1 are denoted by the same reference numerals, and the explanation will be appropriately omitted.

A measurement system 200 includes the projector 10, a sub-pixel position measuring unit 210, and a pattern image storage unit 220. In addition, the projector 10 may also include the sub-pixel position measuring unit 210 and the pattern image storage unit 220.

The sub-pixel position measuring unit 210 includes an imaging device, such as a digital still camera, and measures the display position of a display sub-pixel which forms a display pixel on the screen SCR projected by the projection unit 100. The pattern image storage unit 220 stores a pattern image for measuring the position of a display sub-pixel of a projection image (display image) projected onto the screen SCR. The sub-pixel position measuring unit 210 images an image, which is projected onto the screen SCR by the projection unit 100, using a pattern image stored in the pattern image storage unit 220 and measures the display position of a display sub-pixel, which forms each display pixel, using the imaging data as image information. The shift amount of the display position of the display sub-pixel measured by the sub-pixel position measuring unit 210 is stored in the shift amount storage section 22 of the image processing unit 20.

Figure 5:
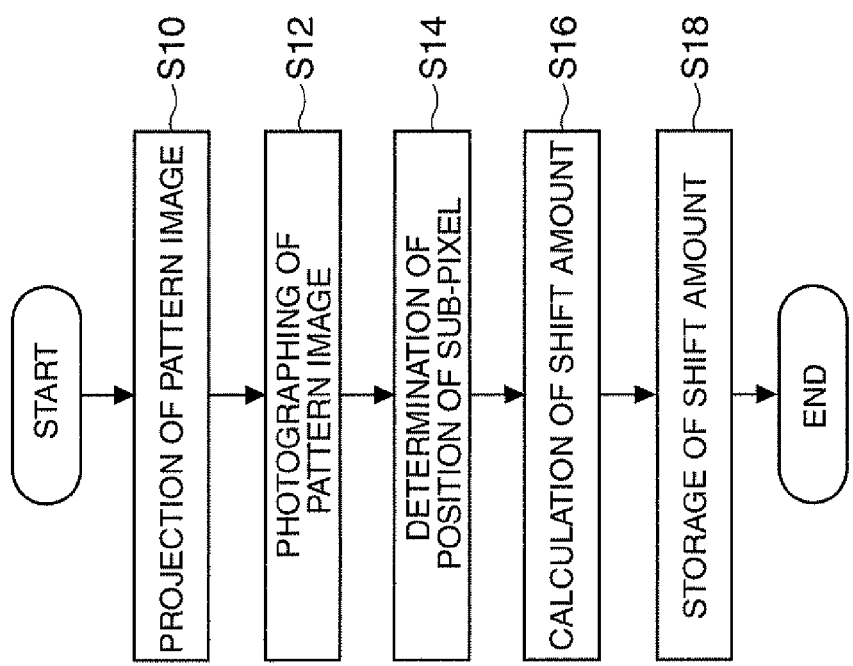
FIG. 5 is a flow chart illustrating an example of processing for acquiring the shift amount of the display sub-pixel position in the measurement system of FIG. 4.

FIG. 5 is a flow chart illustrating an example of processing for acquiring the shift amount of the display sub-pixel position in the measurement system 200 of FIG. 4.

First, in the projector 10, image information corresponding to a pattern image stored in the pattern image storage unit 220 is read and the projection unit 100 projects the pattern image onto the screen SCR (step S10). After projecting the pattern image, the sub-pixel position measuring unit 210 of the projector 10 photographs a display image to be displayed on the screen SCR (step S12). The sub-pixel position measuring unit 210 photographs the display image with a larger number of imaging pixels than the number of pixels of the display image to be displayed on the screen SCR. That is, the sub-pixel position measuring unit 210 photographs and acquires a display pixel, which is equivalent to one pixel of the display image to be displayed on the screen SCR, with a larger number of imaging pixels than one pixel.

Then, the sub-pixel position measuring unit 210 determines the display position of the display sub-pixel (step S14). Then, the sub-pixel position measuring unit 210 or the image processing unit 20 calculates a shift amount of the display position of the display sub-pixel determined in step S14 using a predetermined reference position within the display image as a reference position (step S16) and stores the calculated shift amount in the shift amount storage section 22 (step S18), completing the series of processing (End).

Figure 6:
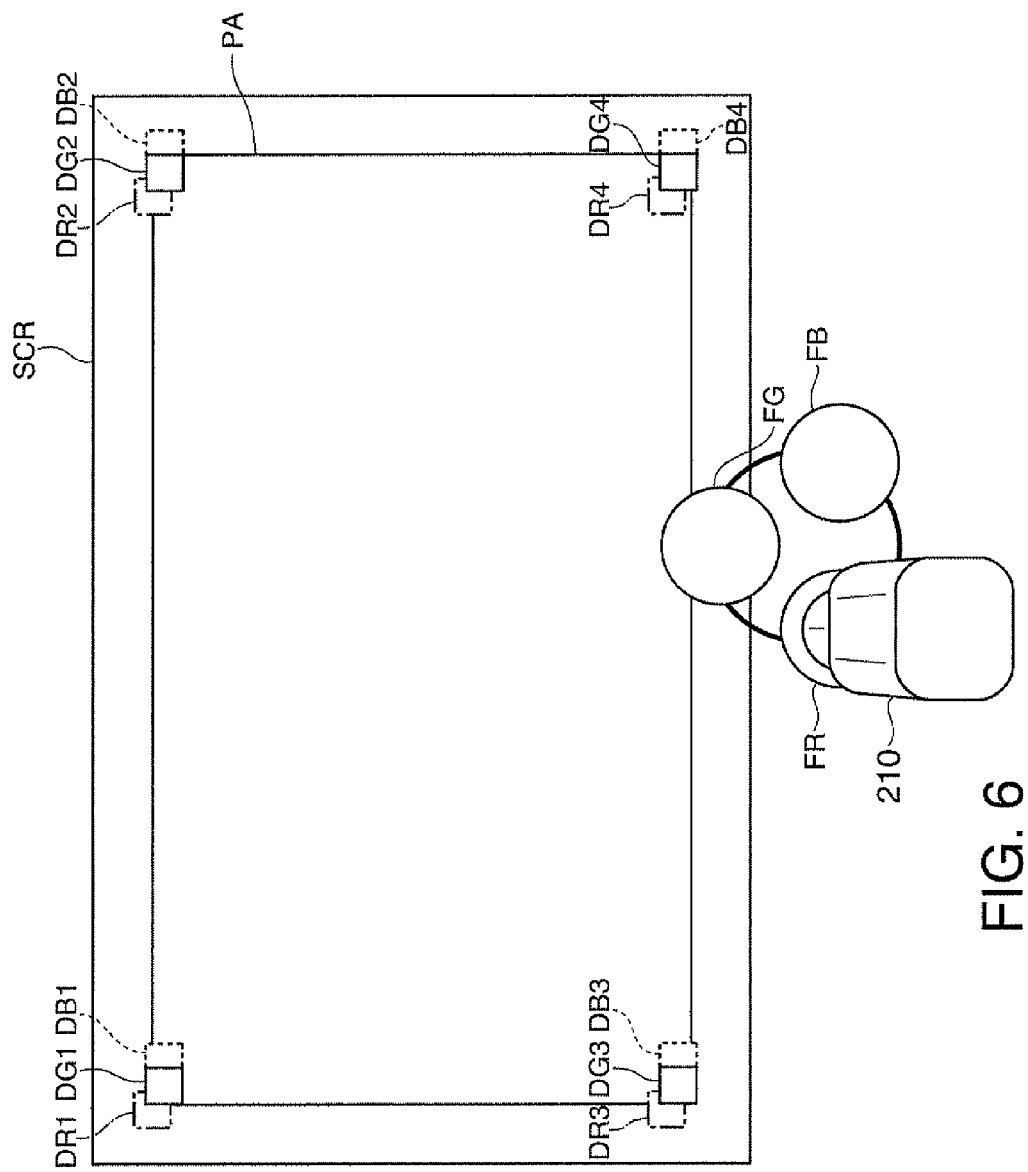
FIG. 6 is a view illustrating an example of imaging processing of a pattern image in the first embodiment.

FIG. 6 shows an example of imaging processing of a pattern image in the first embodiment. In FIG. 6, the same portions as in FIG. 4 are denoted by the same reference numerals, and the explanation will be appropriately omitted.

In FIG. 6, the display positions of display sub-pixels corresponding to sub-pixels which form one pixel are shifted from each other when a pattern image in the first embodiment is projected onto the screen SCR. Although the optical system of the projector 10 needs to be adjusted such that the display positions of display sub-pixels which form a display pixel are equal, it is not easy to make the display positions of display sub-pixels, which form one display pixel, completely equal due to an aberration and the like of the optical system.

A pattern image stored in the pattern image storage unit 220 has four pixels at four corners of a projected area PA projected onto the screen SCR. Each pixel has an R-component display sub-pixel, a G-component display sub-pixel, and a B-component display sub-pixel. In addition, each display sub-pixel is schematically shown to have a rectangular shape. In practice, however, the shape of a display pixel does not become a rectangular shape due to a distortion aberration and the like of the lens.

In step S12 of FIG. 5, all sub-pixels which form one pixel are projected at the same time, and the sub-pixel position measuring unit 210 images a display image of the screen SCR through an R-component color filter FR. Similarly, the sub-pixel position measuring unit 210 images a display image of the screen SCR through a G-component color filter FG and then images a display image of the screen SCR through a B-component color filter FB. Accordingly, a display sub-pixel corresponding to an R-component sub-pixel, a display sub-pixel corresponding to a G-component sub-pixel, and a display sub-pixel corresponding to a B-component sub-pixel can be acquired.

In addition, a method of acquiring display sub-pixels is not limited to that described in FIG. 6. For example, it may be possible to display sub-pixels and to repeat imaging the display sub-pixels for every color component without providing a color filter.

In step S12 of FIG. 5, the sub-pixel position measuring unit 210 or the image processing unit 20 acquires imaging data display sub-pixels DG1 to DG4 corresponding to G-component sub-pixels by imaging of the sub-pixel position measuring unit 210. Then, in step S14 of FIG. 5, the position of the display sub-pixel corresponding to the G-component sub-pixel is determined in a region of each of the display sub-pixels DG1 to DG4 corresponding to the G-component sub-pixels.

As this determination processing, a pixel with a largest pixel value can be determined as the sub-pixel position. For example, it is possible to calculate a brightness histogram of a region of each display pixel and specify a pixel with the largest brightness as a pixel whose pixel value is largest. Alternatively, it is also possible to calculate a brightness histogram of a region of each display pixel and determine the central position of a pixel with a predetermined threshold value or more as a sub-pixel position.

Similarly, also for R and B components, sub-pixel positions corresponding to display sub-pixels DR1 to DR4 and DB1 to DB4 corresponding to sub-pixels are determined. As a result, sub-pixel positions of the display sub-pixels of R, G, and B components are determined. For example, shift amounts of sub-pixel positions of display sub-pixels corresponding to the sub-pixels of R and B components when the sub-pixel position of a display sub-pixel corresponding to the G-component sub-pixel is set as a reference position are stored in the shift amount storage section 22.

That is, in the first embodiment, shift amounts are the shift amount of the display position of a display sub-pixel corresponding to an R-component sub-pixel when the display position of a display sub-pixel corresponding to a G-component sub-pixel is set as the reference position and the shift amount of the display position of a display sub-pixel corresponding to a B-component sub-pixel when the display position of the display sub-pixel corresponding to the G-component sub-pixel is set as the reference position. Thus, the reference position is a display position of a display sub-pixel corresponding to a G-component sub-pixel which forms a pixel. Accordingly, the capacity for shift amounts to be stored can be significantly reduced by defining the shift amounts of display positions of other display sub-pixels using a display position of one display sub-pixel which forms a display pixel as a reference position. Furthermore, by setting the display position of a display sub-pixel corresponding to the G-component sub-pixel, among display sub-pixels of a plurality of color components which form a display pixel, as a reference position, an image signal corresponding to display sub-pixels of other color components can be corrected with the display sub-pixel of the color component, which is easy to be recognized to human eyes, as a reference. As a result, deterioration of the image quality can be prevented.

Thus, by providing the sub-pixel position measuring unit 210 so that a display sub-pixel projected by the projector 10 is imaged and the shift amount of display position of the sub-pixel is calculated, deterioration of the image quality can be prevented even if there is an individual difference of a projector in shifting of the display position of a display sub-pixel.

Next, an operation of each section of the image processing unit 20 of FIG. 1 will be described.

Figure 7:
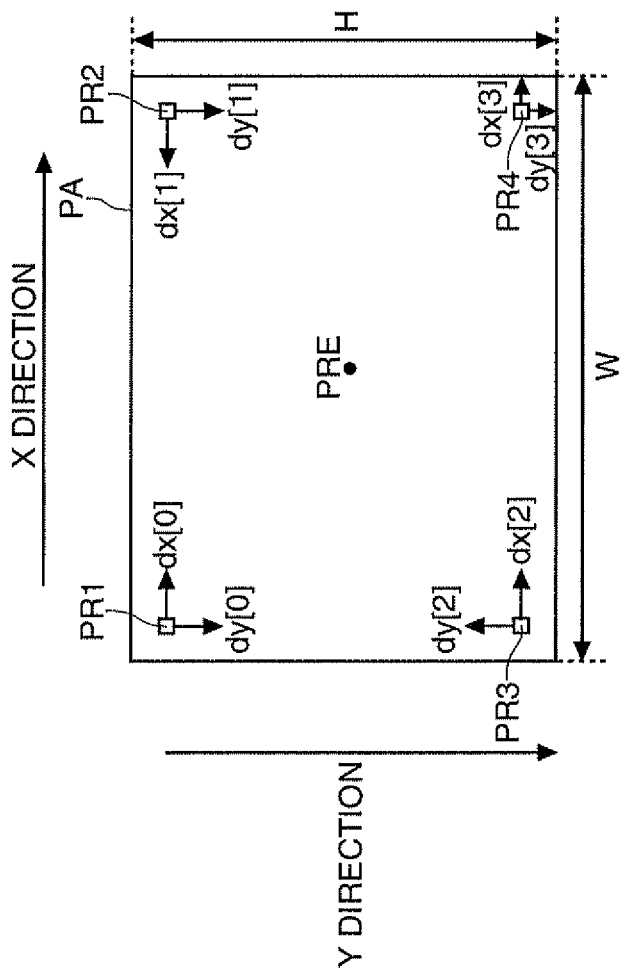
FIG. 7 is a view for explaining an operation of a shift amount calculating section of FIG. 1.

FIG. 7 is a view for explaining an operation of the shift amount calculating section 24 of FIG. 1.

FIG. 7 shows the projected area PA of a display image (the number of pixels in the horizontal direction is W, and the number of pixels in the vertical direction is H) projected by the projection unit 100. The shift amount storage section 22 stores shift amounts of display positions of display sub-pixels which form display pixels at or near four corners of a display image.

Moreover, in FIG. 7, the shift amounts of display positions of R-component display sub-pixels PR1 to PR4, for example, are schematically shown. The shift amount includes a shift amount dx in an x direction, which is the horizontal direction, and a shift amount dy in a y direction, which is a vertical direction. That is, the shift amount storage section 22 stores a shift amount dx[0] in the x direction and a shift amount dy[0] in the y direction, for example, for the shift amount of the display position of the display sub-pixel PR1.

Here, it is preferable that the shift amount of the display position of the display sub-pixel be normalized as follows.

Figure 8:
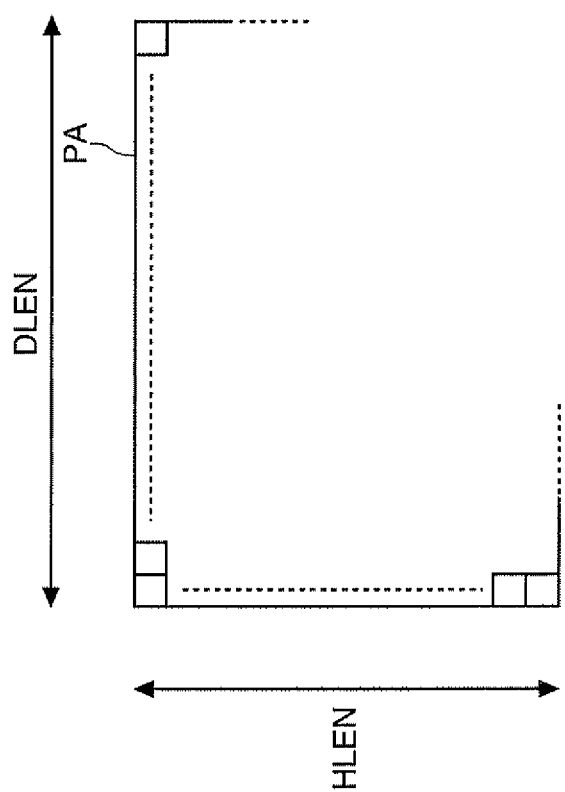
FIG. 8 is a view for explaining the shift amount of the display position of a display sub-pixel in the first embodiment.

FIG. 8 is a view for explaining the shift amount of the display position of a display sub-pixel in the first embodiment. In FIG. 8, the same portions as in FIG. 7 are denoted by the same reference numerals, and the explanation will be appropriately omitted.

The size of the projected area PA of the display image projected by the projection unit 100 of the projector 10 is uniquely set. Here, assuming that the horizontal length of the projected area PA is DLEN and the number of pixels in the horizontal direction is D, it can be specified to which number of pixels the numeric value of the shift amount in the x direction is equivalent by calculating the shift amount in a condition where DLEN/D is set as one unit. Similarly, assuming that the vertical length of the projected area PA is HLEN and the number of pixels in the vertical direction is H, it can be specified to which number of pixels the numeric value of the shift amount in the y direction is equivalent by calculating the shift amount in a condition where HLEN/H is set as one unit.

Using the shift amounts dx[0] and dy[0] of the display sub-pixel PR1, shift amounts dx[1] and dy[1] of the display sub-pixel PR2, shift amounts dx[2] and dy[2] of the display sub-pixel PR3, and shift amounts dx[3] and dy[3] of the display sub-pixel PR4 normalized as described above, the shift amount calculating section 24 calculates a shift amount x_shift in the x direction and a shift amount y_shift in the y direction of a display sub-pixel PRE of the projected area PA.

More specifically, the shift amount calculating section 24 calculates a shift amount x_shift (x, y) of the display sub-pixel PRE in the x direction, which is located at coordinates (x, y) when the upper left corner of the projected area PA is set as the origin, on the basis of shift amounts dx[0] to dx[3]. In this case, the shift amount calculating section 24 calculates the shift amount x_shift (x, y) by linear interpolation processing as shown in the following expression.

$$x\_shift(x, y) = \left(1 - \frac{y}{H-1}\right) \cdot \left\{\left(1 - \frac{x}{W-1}\right) \cdot dx[0] + \left(\frac{x}{W-1}\right) \cdot dx[1]\right\} + \left(\frac{y}{H-1}\right) \cdot \left\{\left(1 - \frac{x}{W-1}\right) \cdot dx[2] + \left(\frac{x}{W-1}\right) \cdot dx[3]\right\} \quad (1)$$

Similarly, the shift amount calculating section 24 calculates a shift amount y_shift (x, y) of the display sub-pixel PRE in the y direction, which is located at coordinates (x, y) when the upper left corner of the projected area PA is set as the origin, on the basis of shift amounts dy[0] to dy[3].

$$y\_shift(x, y) = \left(1 - \frac{x}{H-1}\right) \cdot \left\{\left(1 - \frac{y}{W-1}\right) \cdot dy[0] + \left(\frac{y}{W-1}\right) \cdot dy[1]\right\} + \left(\frac{x}{H-1}\right) \cdot \left\{\left(1 - \frac{y}{W-1}\right) \cdot dy[2] + \left(\frac{y}{W-1}\right) \cdot dy[3]\right\} \quad (2)$$

Moreover, although the shift amounts of the R-component display sub-pixel in the projected area PA were calculated in the explanation of FIGS. 7 and 8, shift amounts of a B-component display sub-pixel in the projected area PA may also be calculated similarly. Thus, even if the shift amount storage section 22 stores only the shift amounts of four corners of the projected area PA, for example, the shift amount calculating section 24 can calculate the shift amounts of all display sub-pixels of other color components excluding the G component in the projected area PA.

Figure 9:
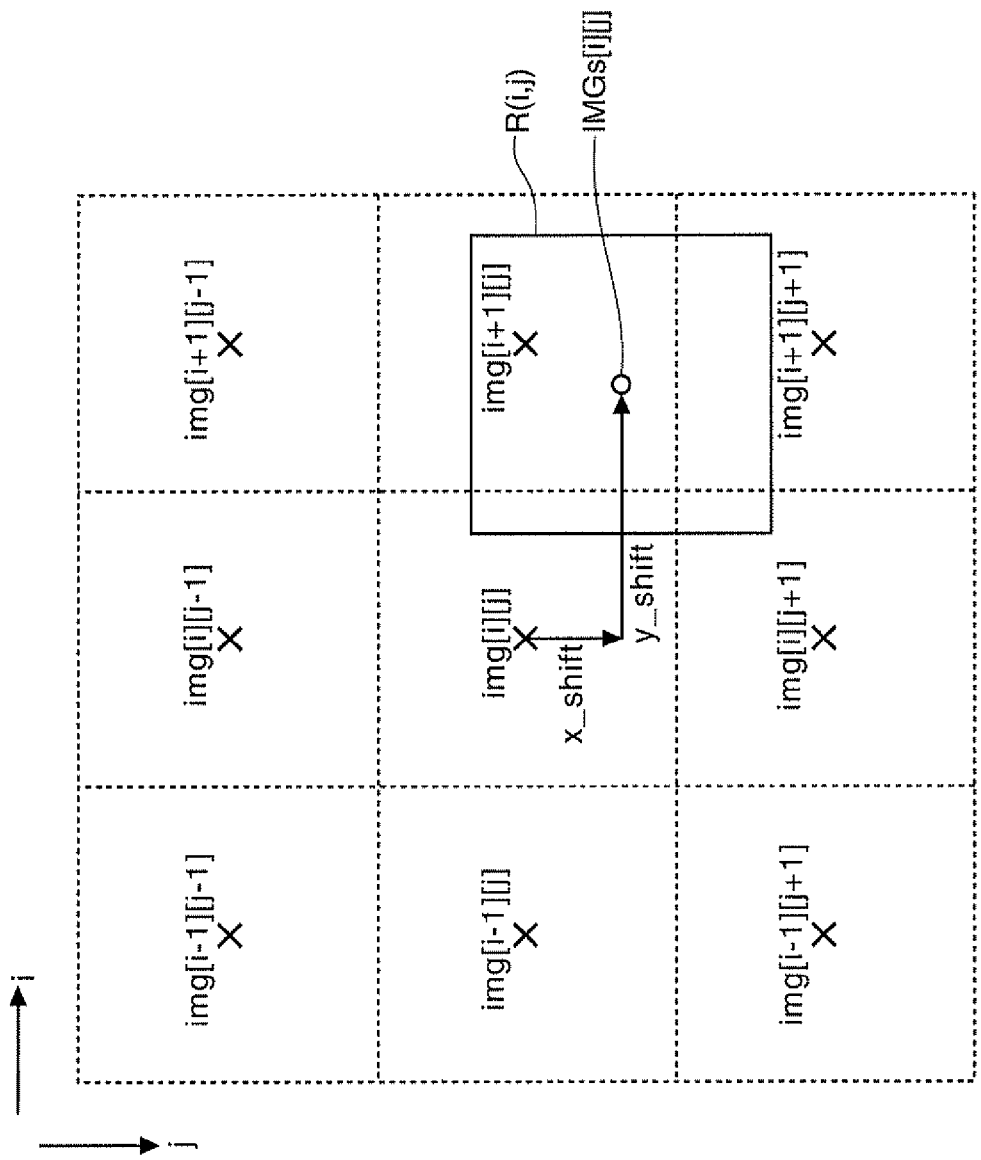
FIG. 9 is a view for explaining an operation of an image signal correcting section of FIG. 1.

FIG. 9 is a view for explaining an operation of the image signal correcting section 28 of FIG. 1.

FIG. 9 shows an explanatory view of correction processing of a pixel value IMGs [i][j] of a sub-pixel R(i, j) corresponding to an R-component display sub-pixel, for example. In FIG. 9, R-component sub-pixels around the R-component sub-pixel R(i, j) defined in the coordinate system in which the upper left corner of a projected area is set as an origin, for example, are schematically shown. Here, it is assumed that an R-component sub-pixel R(i−1, j−1) has a pixel value img [i−1][j−1] and an R-component sub-pixel R(i, j+1) has a pixel value img [i][j+1], for example.

The display position of a display sub-pixel corresponding to the sub-pixel R(i, j) of FIG. 9 is assumed to be shifted by x_shift in the x direction and by y_shift in the y direction from the display position of a display sub-pixel corresponding to a G-component sub-pixel. The shift amount is read from the shift amount storage section 22 or is calculated by the shift amount calculating section 24 described in FIGS. 7 and 8.

The image signal correcting section 28 calculates the pixel value IMGs [i][j] of the sub-pixel R(i, j) on the basis of the shift amount by an area gradation method using pixel values of sub-pixels (sub-pixels adjacent to the sub-pixel R(i, j) in the x direction, sub-pixels adjacent to the sub-pixel R(i, j) in the y direction) around the sub-pixel R(i, j) and outputs the pixel value IMGs [i][j] to the projection unit 100 as a corrected image signal.

$$IMGs[i][j] = (1-y\_shift) \cdot \{(1-x\_shift) \cdot img[i][j] + x\_shift \cdot img[i+1][j]\} + y\_shift \{(1-x\_shift) \cdot img[i][j+1] + x\_shift \cdot img[i+1][j+1]\} \quad (3)$$

The image signal correcting section 28 performs correction processing based on the above shift amounts for image signals in which dummy image signals corresponding to dummy sub-pixels, which are provided outside sub-pixels in an endmost portion of an input image, are added to input image signals of sub-pixels which form each pixel of the input image.

In FIG. 1, the dummy image signals are added by the dummy image signal adding section 26 at a point of time when the input image signals are input to the projector 10 or the image processing unit 20. However, it is preferable that the image signal correcting section 28 perform correction processing based on the above shift amounts for image signals in which dummy image signals are added to input image signals. In this case, the projector 10 of FIG. 1 may have a configuration in which the dummy image signal adding section 26 is omitted. For example, the configuration may be realized by storing an input image signal in a predetermined region of a memory where a dummy image signal is set beforehand and making the image signal correcting section 28 perform the above-described correction processing on an image signal read from the memory as an image signal in which a dummy image signal is added to an input image signal.

Here, a dummy image signal will be described.

Figure 10A:
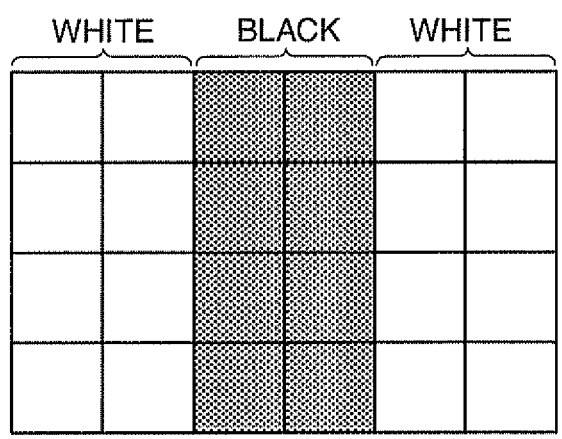
FIGS. 10A to 10C are views for explaining correction processing on an image signal in which dummy image signals are not added to an input image signal.
Figure 10B:
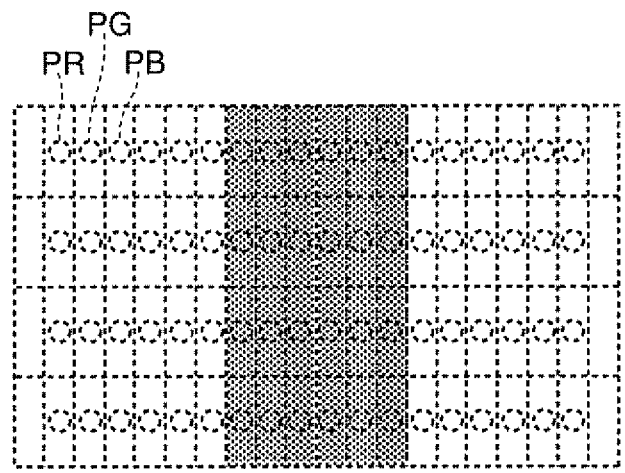
Figure 10C:
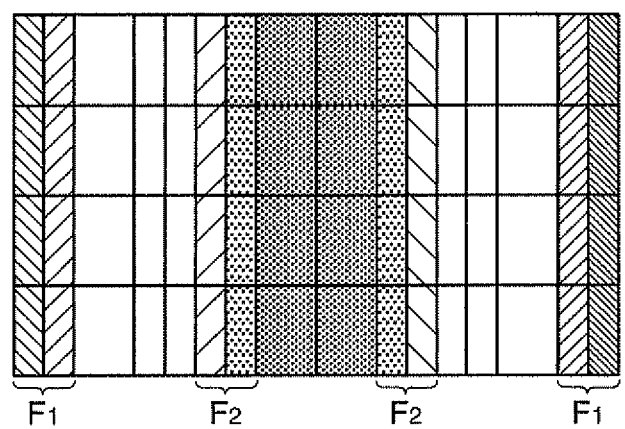

FIGS. 10A to 10C are views for explaining correction processing on an image signal in which a dummy image signal is not added to an input image signal. FIG. 10A schematically shows an input image having six pixels in the horizontal direction and four pixels in the vertical direction. FIG. 10B shows a situation of correction processing explained in FIG. 9 for the image signal of FIG. 10A. Moreover, in FIG. 10B, it is assumed that display sub-pixels of R and B components are shifted by ⅓ pixel in an x direction from the display position of a G-component display sub-pixel. FIG. 10C schematically shows a display image displayed on the basis of the image signal of FIG. 10B.

FIG. 10A shows an input image having 'black' stripes in the vertical direction on a 'white' background image, for example. However, in FIG. 10B, correction processing is performed on an image signal in which a dummy image signal is not added to an input image signal. Accordingly, sub-pixels corresponding to R-component display sub-pixels or B-component display sub-pixels, which form a display pixel in a horizontal endmost portion of the display image of FIG. 10C, are excluded from objects to be corrected because sub-pixels used in correction processing do not exist. However, it is necessary to exceptionally correct the sub-pixels. As a result, in spite of an image which is to display 'white' or 'black' originally, a false color is generated or a sense of resolution deteriorates due to R-component display sub-pixels or B-component display sub-pixels in display pixels F1 and F2 in a horizontal endmost portion or near the edge of the display image of FIG. 10C. For this reason, since it is necessary to perform exceptional correction in order to suppress generation of a false color or deterioration of a sense of resolution, the processing load is increased.

Therefore, in the first embodiment, a dummy image signal is added to an input image signal so that lowering of the sense of resolution or generation of the false color can be suppressed without performing exceptional correction processing on sub-pixels corresponding to display sub-pixels which form a display pixel.

FIGS. 11A and 11B are views for explaining a dummy image signal. FIG. 11A schematically shows an input image signal corresponding to an input image. FIG. 11B schematically shows an image signal in which a dummy image signal is added to an input image signal.

FIG. 11A shows that pixel values of pixels which form an input image are D00, D01, ..., and D53. Each pixel is formed by a plurality of sub-pixels, and a pixel value of each pixel is formed by pixel values of a plurality of sub-pixels which form each pixel. For example, a pixel having a pixel value D00 has a pixel value of an R-component sub-pixel, a pixel value of a G-component sub-pixel, and a pixel value of a B-component sub-pixel.

On the other hand, in FIG. 11B, dummy image signals corresponding to dummy sub-pixels, which are provided outside sub-pixels in an endmost portion of an input image, are added. Accordingly, dummy image signals corresponding to dummy pixels formed by dummy sub-pixels are added to the outside of pixels formed by sub-pixels in the endmost portion of the input image. In FIG. 11B, a dummy image signal corresponding to a pixel value '0' of a dummy sub-pixel is added to an input image signal, and a pixel value of a dummy pixel formed by dummy sub-pixels is also set to '0'.

Here, it is preferable that the dummy image signal have a pixel value equal to or smaller than the brightness of a sub-pixel in the endmost portion of the input image. In this case, since a dummy image signal has a pixel value of lowest brightness, the dummy image signal necessarily has a pixel value equal to or smaller than the brightness of a sub-pixel in the endmost portion regardless of the brightness of the sub-pixel in the endmost portion. When pixel values designated by dummy image signals corresponding to dummy sub-pixels of R, G, and B components are '0', they become pixel values of 'black' with lowest brightness, which means that 'black' dummy pixels are provided outside pixels in the endmost portion of the input image.

Figure 12A:
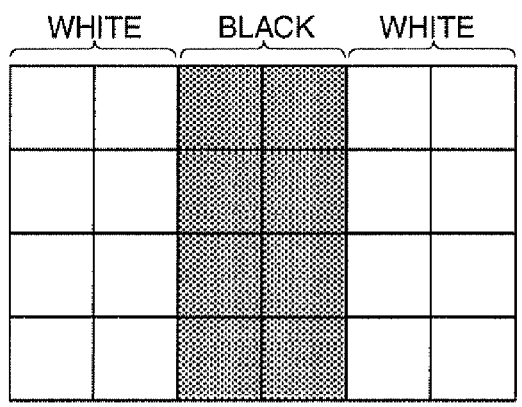
FIGS. 12A to 12C are views for explaining correction processing on image signals in which dummy image signals are added to input image signals.
Figure 12B:
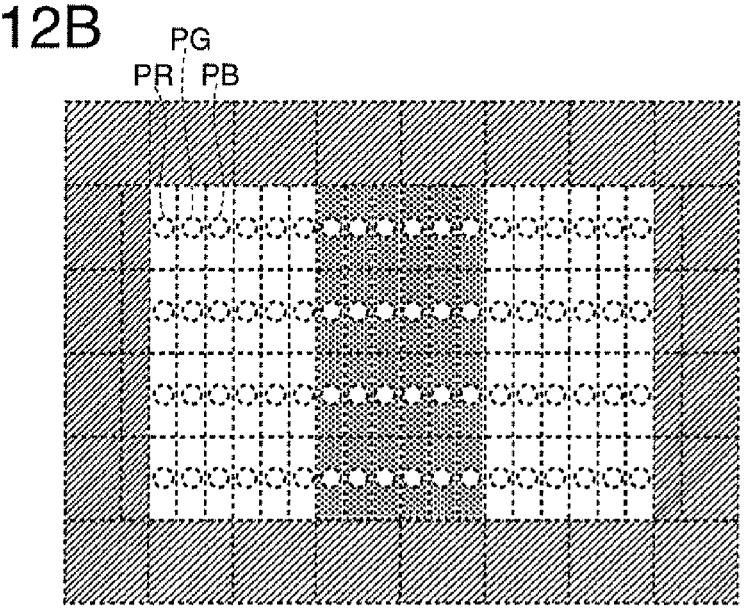
Figure 12C:
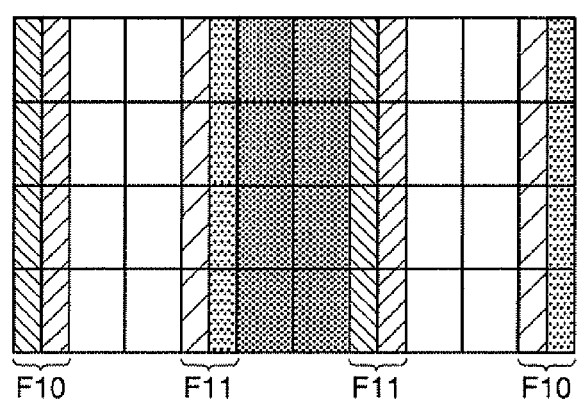

FIGS. 12A to 12C are views for explaining correction processing on image signals in which dummy image signals are added to input image signals. FIG. 12A schematically shows an input image having six pixels in the horizontal direction and four pixels in the vertical direction. FIG. 12B shows a situation of correction processing explained in FIG. 9 for the image signal of FIG. 12A. Moreover, in FIG. 12B, it is assumed that display sub-pixels of R and B components are shifted by ⅓ pixel in opposite directions along the x direction from the display position of a G-component display sub-pixel. FIG. 12C schematically shows a display image displayed on the basis of the image signal of FIG. 12B.

FIG. 12A shows an input image having 'black' stripes in the vertical direction on a 'white' background image, for example. In this case, in FIG. 12B, correction processing on an image signal in which a dummy image signal is added to an input image signal is performed. Accordingly, for sub-pixels corresponding to R-component display sub-pixels or B-component display sub-pixels which form a display pixel in a horizontal endmost portion of the display image of FIG. 12C, correction processing using a dummy image signal is performed. For this reason, correction processing can be similarly performed for all sub-pixels without performing exception processing on these sub-pixels. Moreover, since image signals of sub-pixels in the endmost portion are corrected using dummy image signals having pixel values equal to or smaller than the brightnesses of sub-pixels in the endmost portion, generation of a false color or deterioration of a sense of resolution caused by R-component display sub-pixels or B-component display sub-pixels can be suppressed in display pixels F10 and F11 in a horizontal endmost portion or near the edge of the display image of FIG. 12C.

In addition, although the display positions of the display sub-pixels are shifted from each other only in the x direction in the examples explained in FIGS. 12A to 12C, the same is true for the case where the display positions of the display sub-pixels are shifted from each other in the y direction.

Figure 13:
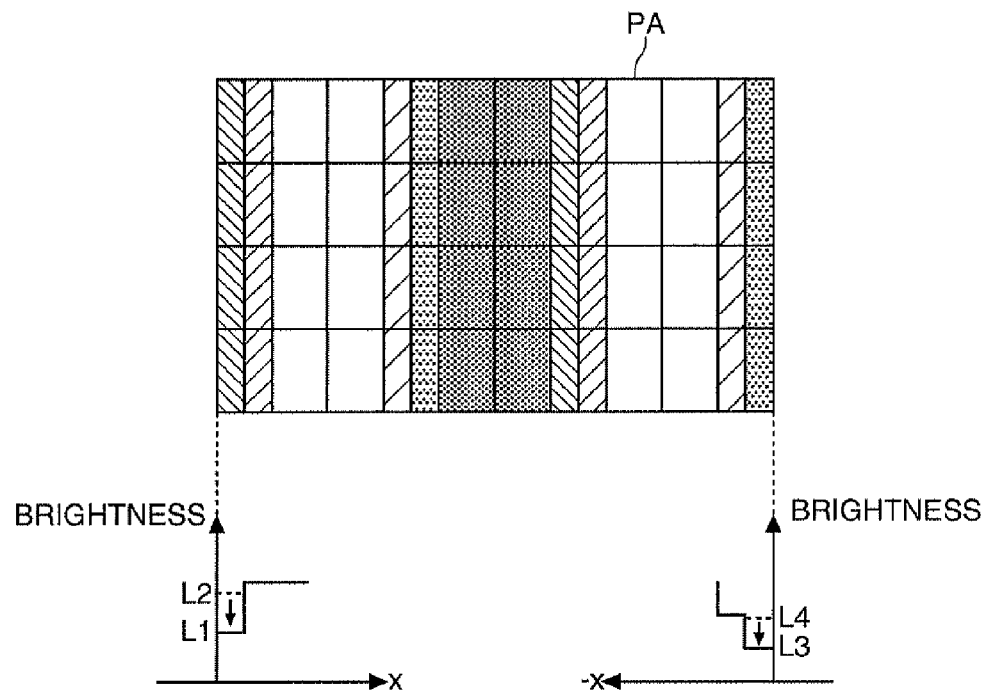
FIG. 13 is a view for explaining a display image of the projector in the first embodiment.

FIG. 13 is a view for explaining a display image of the projector 10 in the first embodiment.

FIG. 13 schematically shows a display image projected by the projector 10. Moreover, in this display image, it is assumed that the display positions of display sub-pixels of R and B components are shifted by ⅓ pixel in the x direction from the display position of a G-component display sub-pixel, similar to FIG. 12B. In addition, FIG. 13 schematically shows the brightness of display sub-pixels which changes in the horizontal direction from an endmost portion of a display image.

In the first embodiment, the projector 10 corrects image signals corresponding to sub-pixels according to the shift amounts of display positions of display sub-pixels and displays an image on the basis of the image signals. In this case, since dummy image signals having pixel values equal to or smaller than the brightnesses of sub-pixels in the endmost portion are used in correction processing of image signals, the image is displayed such that the brightnesses L1 and L3 of display sub-pixels in the endmost portion of the display image are smaller than the brightnesses L2 and L4 designated by pixel values of original sub-pixels corresponding to the display sub-pixels.

Accordingly, generation of a false color or deterioration of a sense of resolution in the endmost portion of the display image can be prevented.

Figure 14:
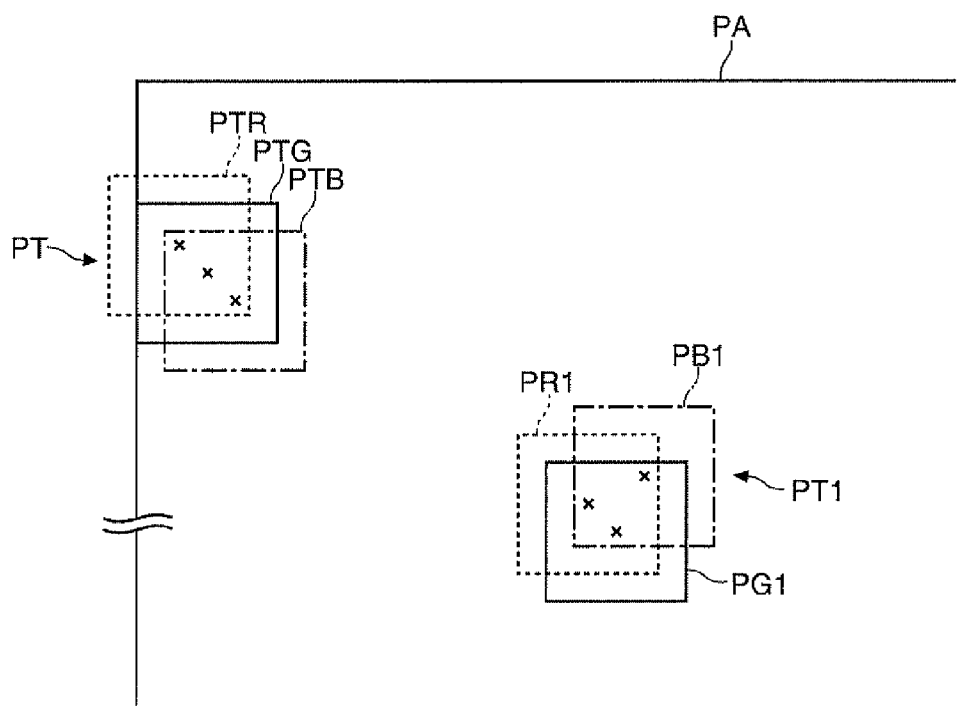
FIG. 14 is a view for explaining a display image of the projector in the first embodiment.

FIG. 14 is a view for explaining a display pixel in an end portion of a display image of the projector 10 in the first embodiment.

FIG. 14 schematically shows a display pixel PT in an end portion of a display image projected by the projector 10. The display pixel PT is formed by an R-component display sub-pixel PTR, a G-component display sub-pixel PTG, and a B-component display sub-pixel PTB. In FIG. 14, it is assumed that a display sub-pixel in an endmost portion among display sub-pixels which form the display pixel PT is the R-component display sub-pixel PTR.

In the first embodiment, the projector 10 corrects image signals corresponding to sub-pixels according to the shift amounts of display positions of display sub-pixels and displays an image on the basis of the image signals. In this case, the shift amounts of the display positions of the display sub-pixels of R and B components are set using the display position of the G-component display sub-pixel as a reference. Therefore, for a sub-pixel corresponding to the G-component display sub-pixel PTG used as a reference of shift amount, correction processing using a dummy image signal is not performed such that the brightness corresponding to a pixel value of the sub-pixel is not changed before and after the correction processing. On the other hand, for a sub-pixel corresponding to the display sub-pixel PTR in the endmost portion between the display sub-pixels PTR and PTB of R and B components, correction processing using a dummy image signal is performed. For this reason, when monochrome display is performed on the whole screen with image signals having the same pixel value for every color component, there is no image in which all color components are uniform colors. In FIG. 14, an image for which R-component monochrome display is performed is displayed such that the brightness of the display sub-pixel PTR in the endmost portion is lower than the brightness of a display sub-pixel PR1 located at the inner side than the sub-pixel PTR as a result of correction processing.

Thus, in the first embodiment, in the case of sequentially performing monochrome display on the whole screen using image signals with the same pixel value for every color component corresponding to sub-pixels which form one pixel, the projection unit 100 displays an image such that, for any one of the color components, the brightness of a display sub-pixel which forms a display pixel in an endmost portion of a display image is lower than the brightness of a display sub-pixel located at the inner side than the endmost portion.

The function of the image processing unit 20 which corrects image signals corresponding to sub-pixels on the basis of the shift amounts using dummy image signals as described above may be realized by hardware or may be realized by software processing.

Figure 15:
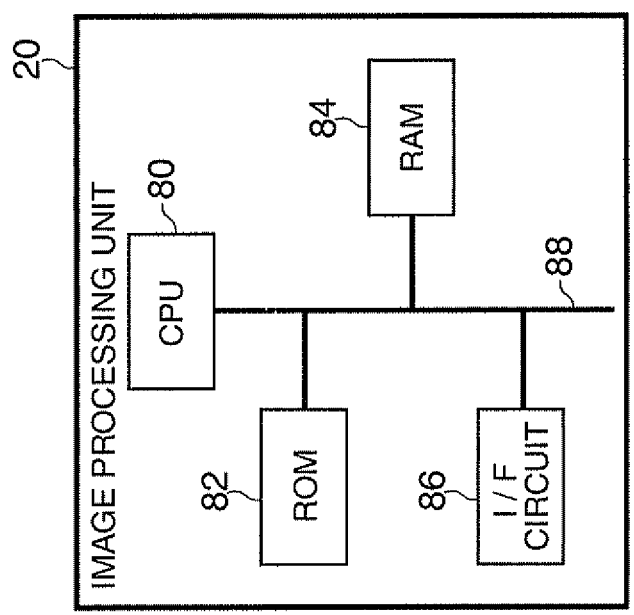
FIG. 15 is a block diagram illustrating an example of the hardware configuration of the image processing unit in the first embodiment.

FIG. 15 is a block diagram illustrating an example of the hardware configuration of the image processing unit 20 in the first embodiment.

The image processing unit 20 includes a central processing unit (CPU) 80, a read only memory (ROM) 82, a random access memory (RAM) 84, and an interface (I/F) circuit 86. The CPU 80, the ROM 82, the RAM 84, and the I/F circuit 86 are connected to each other by a bus 88.

A program is stored in the ROM 82, so that the CPU 80 which read a program through the bus 88 can execute processing corresponding to the program. The RAM serves as a working memory used when the CPU 80 executes processing, or a program read by the CPU 80 is temporarily stored in the RAM 84. The I/F circuit 86 performs interface processing of an input image signal from the outside.

The function of the shift amount storage section 22 of FIG. 1 is realized by the ROM 82 or the RAM 84. The functions of the shift amount calculating section 24, dummy image signal adding section 26, and image signal correcting section 28 of FIG. 1 are realized by the CPU 80 which reads a program stored in the ROM 82 or the RAM 84 through the bus 88 and executes the program. In addition, an image signal acquisition section which is not shown in FIG. 1 has a function of buffering an input image signal supplied from the outside. The function is realized, for example, by the RAM 84 of FIG. 15.

Figure 16:
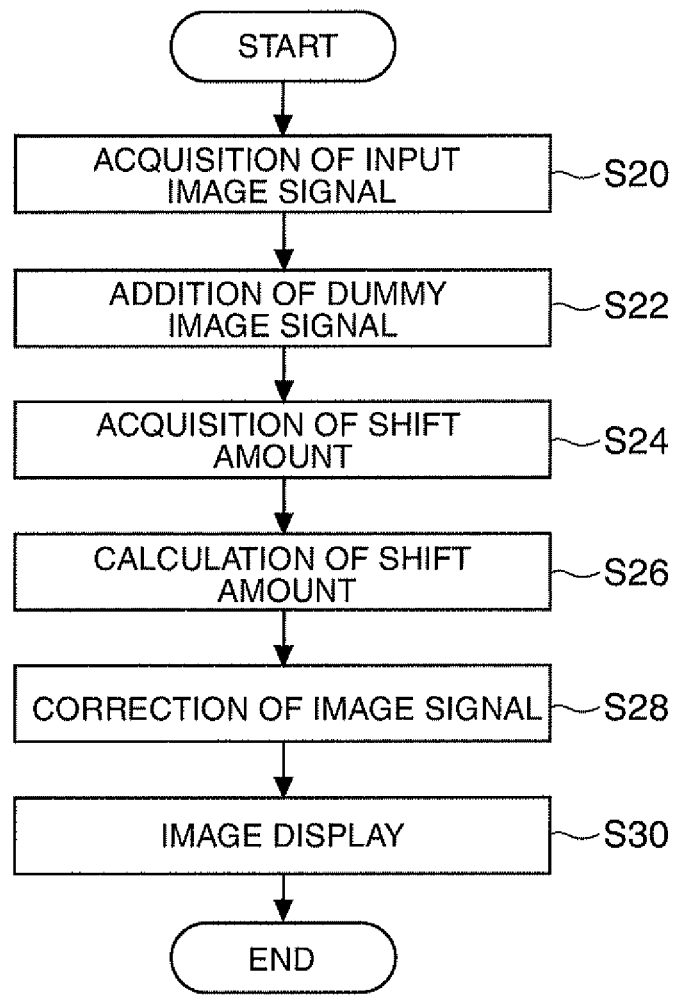
FIG. 16 is a flow chart illustrating a processing example of a projector having the image processing unit in the first embodiment.

FIG. 16 is a flow chart illustrating a processing example of the projector 10 having the image processing unit 20 in the first embodiment.

For example, a program for realizing the processing shown in FIG. 16 is stored beforehand in the ROM 82, and the CPU 80 reads the program stored in the ROM 82 and executes processing corresponding to the program. Thus, the processing shown in FIG. 16 may be realized by software processing.

First, the image processing unit 20 acquires input image signals corresponding to sub-pixels, which form each pixel of an input image, from an image signal generator (not shown) as an input image signal acquisition step (step S20).

Then, the dummy image signal adding section 26 of the image processing unit 20 adds dummy image signals corresponding to dummy sub-pixels, which are provided outside the sub-pixels in the endmost portion of the input image, to the input image signals acquired in step S20 as a dummy image signal adding step (step S22). For example, when the shift amounts of display positions of display sub-pixels of R and B components are defined using the display position of a display sub-pixel of a G-component as a reference position, a dummy image signal is not added for the G component and a dummy image signal is added to an input image signal corresponding to each color component only for the R and B components. Here, the dummy image signal has a pixel value equal to or smaller than the brightness of a sub-pixel of the corresponding color component in the endmost portion of the input image as described above. For example, a dummy image signal of an R-component dummy sub-pixel has a pixel value equal to or smaller than the brightness of an R-component sub-pixel in an endmost portion of an input image adjacent to the dummy sub-pixel.

Then, the shift amount calculating section 24 of the image processing unit 20 acquires the shift amounts stored in the shift amount storage section 22 as a shift amount acquisition step (step S24). In the first embodiment, for example, the shift amounts of sub-pixels at four corners of the projected area PA of FIG. 6 are acquired.

Then, the shift amount calculating section 24 of the image processing unit 20 calculates shift amounts of all sub-pixels of R and B components of the display screen on the basis of the shift amounts stored in the shift amount storage section 22, as described in FIGS. 7 and 8, as a shift amount calculation step (step S26).

Then, the image signal correcting section 28 of the image processing unit 20 corrects an image signal of the sub-pixel position on the basis of the shift amounts, which were calculated in step S26, for every sub-pixel as described in FIG. 9 as an image signal correction step (step S28).

Then, the projection unit 100 displays an image by projecting light, which is modulated on the basis of the image signal corrected by the image processing unit 20, onto the screen SCR as an image display step (step S30), completing the series of processing (End).

Figure 17:
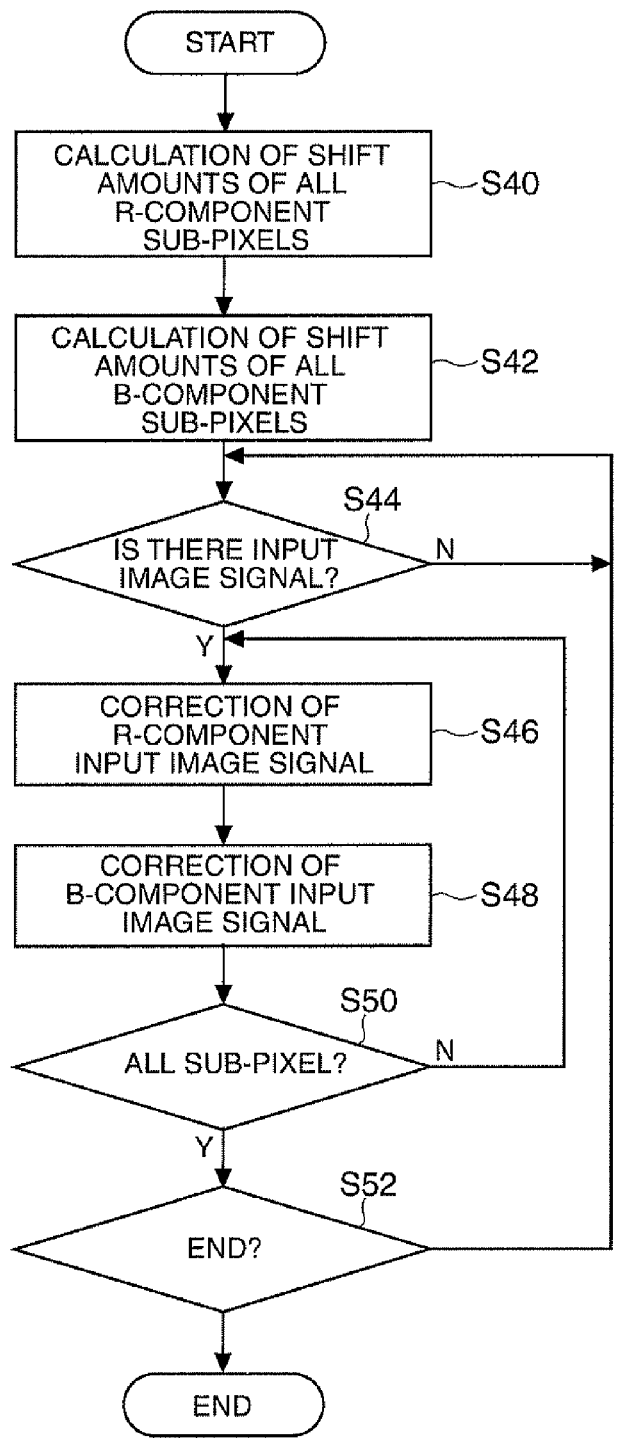
FIG. 17 is a flow chart illustrating a detailed processing example of steps S26 and S28 of FIG. 16.

FIG. 17 shows a flow chart of a detailed processing example of steps S26 and S28 of FIG. 16. For example, a program for realizing the processing shown in FIG. 17 is stored beforehand in the ROM 82, and the CPU reads the program stored in the ROM 82 and executes processing corresponding to the program. Thus, the processing shown in FIG. 17 may be realized by software processing.

In the shift amount calculation step of step S26 of FIG. 16, the shift amount calculating section 24 calculates the shift amounts of all R-component sub-pixels (step S40). More specifically, the shift amount calculating section 24 calculates the shift amounts of all R-component sub-pixels within the display image by interpolation processing using the shift amounts of display sub-pixels stored in the shift amount storage section 22. Although an example of calculating the shift amount by a linear interpolation method was described in FIGS. 7 and 8, the shift amount calculating section 24 may also calculate the shift amounts of all sub-pixels using a nearest-neighbor method, a bicubic method, and the like.

Similarly, the shift amount calculating section 24 calculates the shift amounts of all B-component sub-pixels (step S42). Also in step S42, the shift amount calculating section 24 calculates the shift amounts of all B-component sub-pixels within the display image by interpolation processing using the shift amounts of display sub-pixels stored in the shift amount storage section 22.

Then, the image signal correcting section 28 determines whether or not there is an input image signal (step S44). When it is determined that there is no input image signal in step S44

(step S44: N), the image signal correcting section 28 waits for the input of an input image signal.

When it is determined that there is an input image signal in step S44 (step S44: Y), the image signal correcting section 28 performs correction processing on an R-component input image signal of the input image signals using the shift amounts calculated in step S40 (step S46). Then, the image signal correcting section 28 performs correction processing on a B-component input image signal of the input image signals using the shift amounts calculated in step S42 (step S48).

Until the correction processing on all sub-pixels of R and B components within the display image ends (step S50: N), the process returns to step S46 to perform correction processing on each sub-pixel within the image. On the other hand, when correction processing on all sub-pixels of R and B components within the display image ends (step S50: Y) and when correction processing according to the shift amount does not end (step S52: N), the process returns to step S44 to continue processing. When the correction processing according to the shift amount ends (step S52: Y), the series of processing is completed (End).

As described above, according to the first embodiment, even if display sub-pixels which form a display pixel are shifted from each other, generation of a false color or deterioration of a sense of resolution in an endmost portion or near the edge of the display image can be suppressed. Moreover, since image signals of sub-pixels in the endmost portion are corrected using dummy image signals having pixel values equal to or smaller than the brightnesses of sub-pixels in the endmost portion, correction processing of the sub-pixels can be performed without exception processing regardless of whether or not the corresponding image signals are image signals of sub-pixels corresponding to display sub-pixels which form a display pixel in the endmost portion. As a result, since the processing load can be significantly reduced, the correction processing can be performed at high speed.

Second Embodiment

In the first embodiment, image signals in which dummy image signals are added to input image signals are prepared and then the image signal correcting section 28 performs correction processing according to the shift amounts of display positions of display sub-pixels. However, the invention is not limited thereto. In a second embodiment of the invention, it is detected whether or not input image signals are image signals of sub-pixels corresponding to display sub-pixels, which form a display pixel in an endmost portion of a display image, and an image signal correcting section corrects the image signals according to the detection result. Accordingly, correction processing corresponding to the shift amount is performed without securing a memory area which is needed by preparing image signals in which dummy image signals are added to input image signals.

Figure 18:
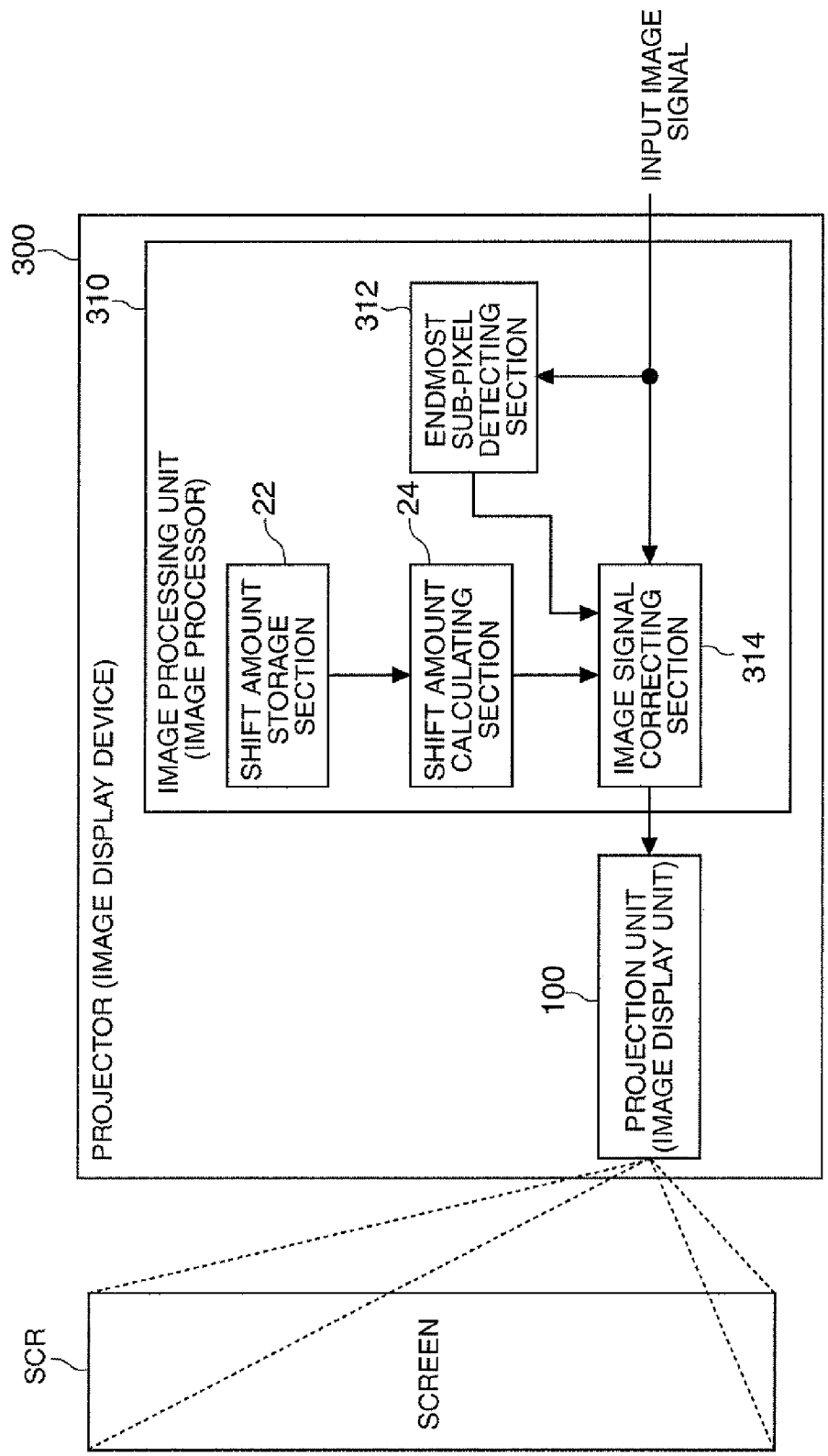
FIG. 18 is a block diagram illustrating an example of the configuration of a projector as an image display device according to a second embodiment of the invention.

FIG. 18 is a block diagram illustrating an example of the configuration of a projector as an image display device according to the second embodiment of the invention. In FIG. 18, the same portions as in FIG. 1 are denoted by the same reference numerals, and the explanation will be appropriately omitted.

A projector 300 as an image display device according to the second embodiment performs image display by projecting light, which is modulated on the basis of image signals corresponding to a plurality of sub-pixels that form one pixel, onto a screen SCR. The projector 300 includes an image processing unit 310 as an image processor and a projection unit 100 as an image display unit.

The image processing unit 310 performs correction processing on an input image signal, which corresponds to a pixel value of each sub-pixel, according to shift amounts of display positions of display sub-pixels which form each display pixel of the display image projected onto the screen SCR. The input image signal is generated by an image signal generator (not shown) and is supplied to the image processing unit 310.

The image processing unit 310 may include a shift amount storage section 22, a shift amount calculating section 24, an endmost sub-pixel detecting section 312, and an image signal correcting section 314. The shift amount storage section 22 stores shift amounts of display positions of display sub-pixels corresponding to sub-pixels, which form a display pixel, using a predetermined reference position within a display image as a reference position. The shift amount calculating section 24 may calculate the shift amount at the sub-pixel position by interpolation processing using shift amounts of a plurality of sub-pixels stored in the shift amount storage section 22 (for example, shift amounts of sub-pixels at four corners of the projected area PA of FIG. 6).

The endmost sub-pixel detecting section 312 detects whether or not input image signals are image signals corresponding to sub-pixels in an endmost portion of an input image. That is, the endmost sub-pixel detecting section 312 detects whether or not the input image signals are image signals of sub-pixels corresponding to display sub-pixels which form a display pixel in the endmost portion of the display image. The detection result obtained by the endmost sub-pixel detecting section 312 is notified to the image signal correcting section 314.

The image signal correcting section 314 performs correction processing of image signals, which correspond to sub-pixels that form each pixel of an input image, on the basis of the shift amounts calculated by the shift amount calculating section 24. More specifically, for an input image signal detected to be an image signal corresponding to a sub-pixel in the endmost portion of the input image by the endmost sub-pixel detecting section 312, the image signal correcting section 314 performs correction processing based on the shift amounts using the input image signal, image signals of surrounding sub-pixels, and dummy image signals corresponding to the dummy sub-pixels. That is, the image signal correcting section 314 performs the correction processing based on the shift amounts described in the first embodiment in a state where a dummy image signal of the input image signal is added.

On the other hand, for an input image signal detected not to be an image signal corresponding to a sub-pixel in the endmost portion of the input image by the endmost sub-pixel detecting section 312, the image signal correcting section 314 performs the correction processing based on the shift amounts described in the first embodiment using the input image signal and image signals of surrounding sub-pixels.

An image signal corrected by the image processing unit 310 is supplied to the projection unit 100. The projection unit 100 is formed by a three plate type LCD projector, for example, and modulates light from a light source (not shown) on the basis of the image signal corrected by the image processing unit 310 and performs projection onto the screen SCR using the modulated light. Since the configuration of the projection unit 100 is the same as that of FIG. 2, a detailed explanation thereof will be omitted.

Similar to the image processing unit 20 in the first embodiment, the function of the image processing unit 310 in the second embodiment may be realized by hardware or may be realized by software processing. For example, the image processing unit 310 in the second embodiment has a hardware configuration shown in FIG. 15.

Figure 19:
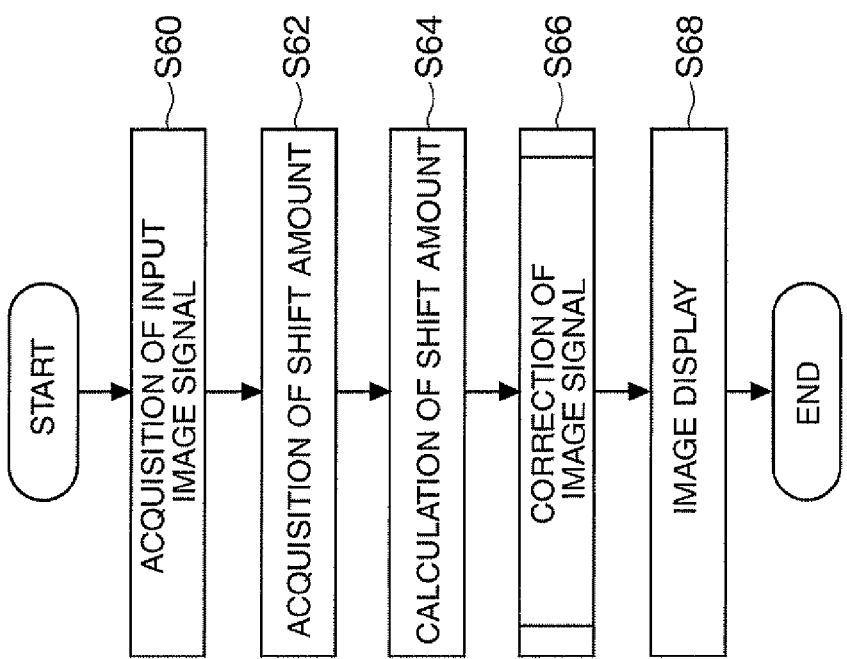
FIG. 19 is a flow chart illustrating a processing example of a projector having the image processing unit in the second embodiment.

FIG. 19 is a flow chart illustrating a processing example of the projector 300 having the image processing unit 310 in the second embodiment.

For example, a program for realizing the processing shown in FIG. 19 is stored beforehand in the ROM 82, and the CPU 80 reads the program stored in the ROM 82 and executes processing corresponding to the program. Thus, the processing shown in FIG. 19 may be realized by software processing.

First, the image processing unit 310 acquires input image signals corresponding to sub-pixels, which form each pixel of an input image, from an image signal generator (not shown) as an input image signal acquisition step (step S60). In this case, the endmost sub-pixel detecting section 312 of the image processing unit 310 detects whether or not the input image signals are image signals corresponding to the sub-pixels in the endmost portion of the input image as an endmost sub-pixel detection step. The detection result obtained in the endmost sub-pixel detection step is notified to the image signal correcting section 314.

Then, the shift amount calculating section 24 of the image processing unit 310 acquires the shift amounts stored in the shift amount storage section 22 as a shift amount acquisition step (step S62). In the second embodiment, for example, the shift amounts of sub-pixels at four corners of the projected area PA of FIG. 6 are acquired similar to the first embodiment.

Then, the shift amount calculating section 24 of the image processing unit 310 calculates shift amounts of all sub-pixels of R and B components of the display screen on the basis of the shift amounts stored in the shift amount storage section 22, as described in FIGS. 7 and 8, as a shift amount calculation step (step S64).

Then, the image signal correcting section 314 of the image processing unit 310 corrects an image signal of the sub-pixel position on the basis of the shift amounts, which were calculated in step S64, for every sub-pixel as described in FIG. 9 as an image signal correction step (step S66).

Then, the projection unit 100 displays an image by projecting light, which is modulated on the basis of the image signal corrected by the image processing unit 310, onto the screen SCR as an image display step (step S68), completing the series of processing (End).

The processing examples of the shift amount calculation step of step S64 and image signal correction step of step S66 of FIG. 19 are the same as those of FIG. 17. However, in the second embodiment, correction processing of an R-component input image signal of step S46 and correction processing of a B-component input image signal of step S48 of FIG. 17 are different from those in the first embodiment.

Figure 20:
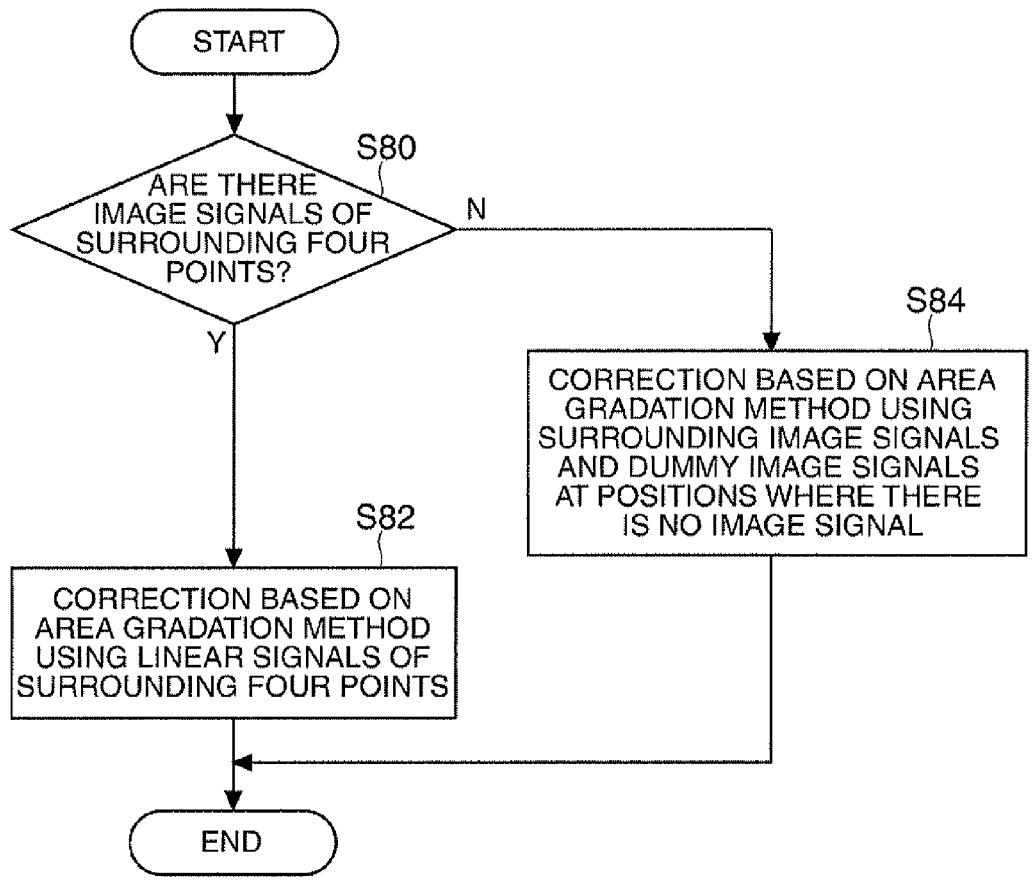
FIG. 20 is a flow chart illustrating a processing example of image signal correction processing in the second embodiment.

FIG. 20 is a flow chart illustrating a processing example of image signal correction processing in the second embodiment. Processing of FIG. 20 is performed in steps S46 and S48 of FIG. 17.

Figure 21A:
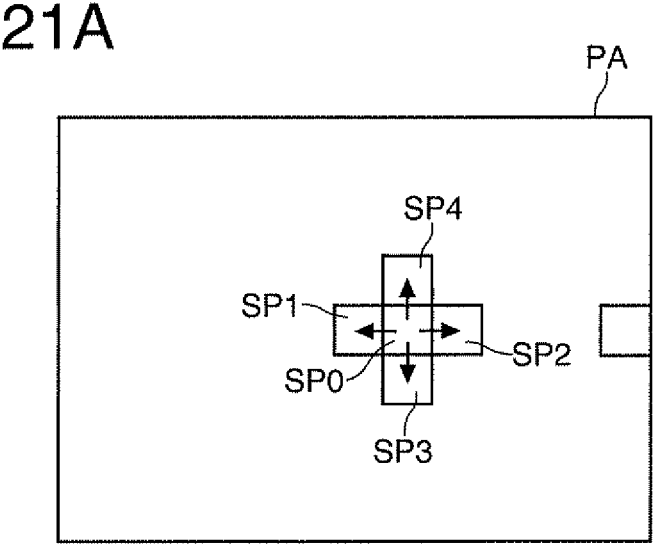
FIGS. 21A and 21B are views for explaining processing of FIG. 20.
Figure 21B:
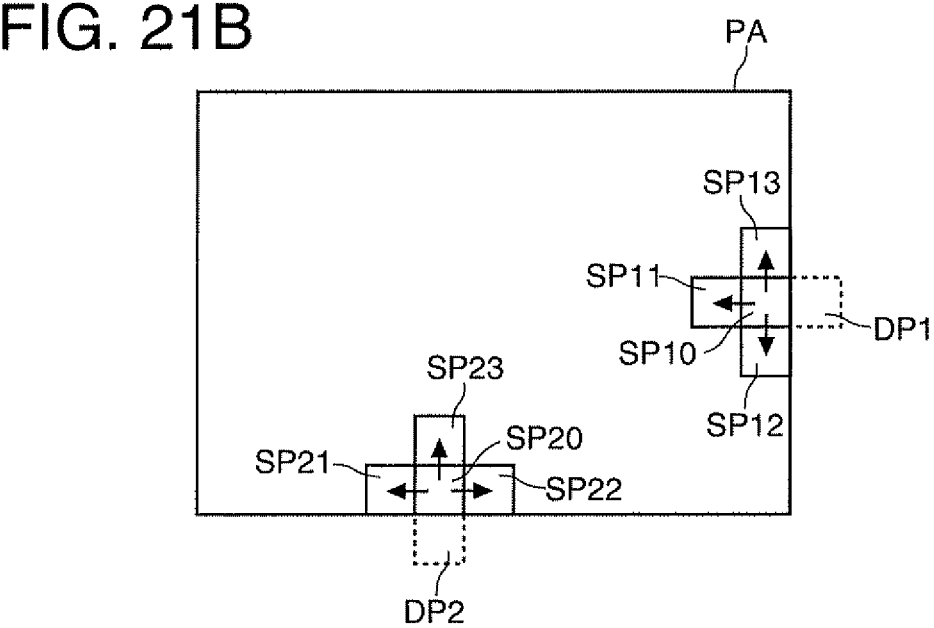

FIGS. 21A and 21B are views for explaining the processing of FIG. 20.

For example, a program for realizing the processing shown in FIG. 20 is stored beforehand in the ROM 82, and the CPU 80 reads the program stored in the ROM 82 and executes processing corresponding to the program. Thus, the processing shown in FIG. 20 may be realized by software processing.

In correcting an R-component input image signal in step S46, when the endmost sub-pixel detecting section 312 detects that there are image signals of surrounding four points of the R-component sub-pixel (when the endmost sub-pixel detecting section 312 detects that the sub-pixel is not an endmost sub-pixel) on the basis of input image signals (step S80: Y), correction processing of an image signal of the sub-pixel at the sub-pixel position is performed as described in FIG. 9 using the image signals of the sub-pixels of the surrounding four points (step S82), completing the series of processing (End).

That is, in step S82, using image signals of sub-pixels corresponding to R-component display sub-pixels SP1 and SP2 adjacent to an R-component display sub-pixel SP0 in the horizontal direction which forms a display pixel within the projected area PA and image signals of sub-pixels corresponding to R-component display sub-pixels SP3 and SP4 adjacent to the display sub-pixel SP0 in the vertical direction, correction processing of an image signal of a sub-pixel corresponding to the display sub-pixel SP0 is performed as described in FIG. 9, as shown in FIG. 21A.

In step S80, when the endmost sub-pixel detecting section 312 detects that there are no image signals of surrounding four points of the R-component sub-pixel (when the endmost sub-pixel detecting section 312 detects that the sub-pixel is an endmost sub-pixel) on the basis of input image signals (step S80: N), correction processing of an image signal of the sub-pixel at the sub-pixel position is performed as described in FIG. 9 using a dummy image signal at the sub-pixel position where there is no image signal and surrounding image signals of the sub-pixel (step S84), completing the series of processing (End).

That is, in step S84, using an image signal of a sub-pixel corresponding to an R-component display sub-pixel SP11 adjacent to an R-component display sub-pixel SP10 in the horizontal direction which forms a display pixel within the projected area PA, image signals of sub-pixels corresponding to R-component display sub-pixels SP12 and SP13 adjacent to the display sub-pixel SP10 in the vertical direction, and a dummy image signal of a dummy sub-pixel DP1, correction processing of an image signal of a sub-pixel corresponding to the display sub-pixel SP10 is performed as described in FIG. 9, as shown in FIG. 21B.

Alternatively, in step S84, using image signals of sub-pixels corresponding to R-component display sub-pixels SP21 and SP22 adjacent to an R-component display sub-pixel SP20 in the horizontal direction which forms a display pixel within the projected area PA, an image signal of a sub-pixel corresponding to an R-component display sub-pixel SP23 adjacent to the display sub-pixel SP20 in the vertical direction, and a dummy image signal of a dummy sub-pixel DP2, correction processing of an image signal of a sub-pixel corresponding to the display sub-pixel SP20 is performed as described in FIG. 9, as shown in FIG. 21B.

Here, similar to the first embodiment, it is preferable that the dummy image signal have a pixel value equal to or smaller than the brightness of a sub-pixel in the endmost portion of the input image. Since a dummy image signal has a pixel value of lowest brightness, the dummy image signal necessarily has a pixel value equal to or smaller than the brightness of a sub-pixel in the endmost portion regardless of the brightness of the sub-pixel in the endmost portion. When pixel values designated by dummy image signals corresponding to dummy sub-pixels of R, G, and B components are '0', they become pixel values of 'black' with lowest brightness.

Also in the second embodiment, the display image shown in FIG. 13 or 14 can be displayed similar to the first embodiment.

As described above, according to the second embodiment, even if display sub-pixels which form a display pixel are shifted from each other, generation of a false color or deterioration of a sense of resolution in an endmost portion or near the edge of the display image can be suppressed. Moreover, since image signals of sub-pixels in the endmost portion are corrected using dummy image signals having pixel values equal to or smaller than the brightnesses of sub-pixels in the endmost portion, correction processing of sub-pixels can be performed without exception processing regardless of whether or not the corresponding image signals are image signals of sub-pixels corresponding to display sub-pixels which form a display pixel in the endmost portion. As a result, since the processing load can be significantly reduced, the correction processing can be performed at high speed. Furthermore, according to the second embodiment, it is detected whether or not input image signals are image signals of sub-pixels corresponding to display sub-pixels, which form a display pixel in an endmost portion of a display image, and the image signal correcting section corrects the image signals according to the detection result. Accordingly, it becomes unnecessary to secure a memory area which is needed by preparing image signals in which dummy image signals are added to input image signals.

Having described the image processor, the image display device, the image processing method, the image display method, and the program according to the embodiments of the invention, the invention is not limited to the above-described embodiments, but various modifications may be made within the scope without departing from the subject matter or spirit of the invention. For example, the following modifications may also be made.

(1) In each of the embodiments described above, the shift amount storage section stored shift amounts of a plurality of sub-pixels sampled as representative points among all pixels within a display image and the shift amount calculating section calculated the shift amount of an arbitrary sub-pixel. However, the invention is not limited thereto. For example, the shift amount storage section may store shift amounts of sub-pixels of one whole screen and the shift amount calculating section may be omitted.

(2) In each of the embodiments described above, the shift amount of the display position of the R-component display sub-pixel and the shift amount of the display position of the B-component display sub-pixel were stored using the display position of the G-component display sub-pixel as a reference position. However, the invention is not limited thereto. For example, the shift amount of the display position of the G-component display sub-pixel and the shift amount of the display position of the B-component display sub-pixel may be stored using the display position of the R-component display sub-pixel as a reference position. Alternatively, the shift amount of the display position of the R-component display sub-pixel and the shift amount of the display position of the G-component display sub-pixel may be stored using the display position of the B-component display sub-pixel as a reference position.

(3) In each of the embodiments described above, one pixel was formed by sub-pixels of three color components. However, the invention is not limited thereto. The number of color components which form one pixel may be 2 or 4 or more.

(4) In each of the embodiments described above, the display position of one display sub-pixel among display sub-pixels which form each display pixel was set as the reference position. However, the invention is not limited thereto. For example, a predetermined position of a screen coordinate system or a predetermined position of a panel coordinate system of each liquid crystal panel may be set as the reference position.

(5) In each of the embodiments described above, a light valve was used as the light modulating section. However, the invention is not limited thereto. For example, a DLP (digital light processing; registered trademark), a LCOS (liquid crystal on silicon), and the like may be adopted as light modulating sections.

(6) In each of the embodiments described above, a light valve using a so-called three plate type transmissive liquid crystal panel was explained as an example of a light modulating section. However, a light valve using a two or four or more plate type transmissive liquid crystal panel may also be adopted.

(7) In each of the embodiments described above, a bilinear method, a nearest-neighbor method, a bicubic method, and an area gradation method were mentioned as examples of interpolation processing method of shift amounts of all sub-pixels or correction processing method of an image signal. However, the invention is not limited to such processing methods.

(8) In each of the embodiments described above, the invention was described as the image processor, the image display device, the image processing method, the image display method, and the program. However, the invention is not limited thereto. For example, the invention may be a recording medium recorded with a program in which the procedure of an image display method for realizing the invention is described.

What is claimed is:

1. A projector that projects an image on the basis of image signals corresponding to sub-pixels which form one pixel, the projector comprising:
    a shift amount storage section that stores shift amounts of display positions of display sub-pixels corresponding to the sub-pixels which form a display pixel with respect to a predetermined reference position within a projected image;
    an image signal correcting section that corrects image signals corresponding to sub-pixels, which form each pixel of an input image, on the basis of the shift amounts stored in the shift amount storage section; and
    a projecting section that projects the image on the basis of image signals corresponding to the sub-pixels corrected by the image signal correcting section, wherein
    the image signal correcting section corrects image signals in which dummy image signals corresponding to dummy sub-pixels, which are provided outside sub-pixels in an endmost portion of the input image, are added to input image signals of the sub-pixels.

2. The projector according to claim 1, further comprising:
    a dummy image signal adding section that adds the dummy image signals to the input image signals, wherein
    the image signal correcting section corrects image signals in which the dummy image signals are added to the input image signals by the dummy image signal adding section.

3. The projector according to claim 1, further comprising:
    an endmost sub-pixel detecting section that detects whether or not the input image signals are image signals corresponding to sub-pixels in the endmost portion of the input image, wherein
    the image signal correcting section corrects image signals using the input image signals and the dummy image signals when it is detected that the input image signals are image signals corresponding to sub-pixels in the endmost portion of the input image and corrects image signals using the input image signals and image signals corresponding to surrounding sub-pixels of the sub-pixels when it is detected that the input image signals are not image signals corresponding to sub-pixels in the endmost portion of the input image.

4. The projector according to claim 1, wherein the dummy image signals have pixel values equal to or smaller than brightnesses of the sub-pixels in the endmost portion of the input image.

5. The projector according to claim 1, wherein the dummy image signals have pixel values of lowest brightness.

6. The projector according to claim 1, further comprising:
a shift amount calculating section that calculates a shift amount at a corresponding sub-pixel position on the basis of the shift amounts stored in the shift amount storage section, wherein
the image signal correcting section corrects an image signal corresponding to the sub-pixel position on the basis of the shift amount calculated by the shift amount calculating section.

7. The projector according to claim 1, wherein
when each pixel is formed by sub-pixels of R, G, and B components, the reference position is a display position of a display sub-pixel corresponding to the G-component sub-pixel.

8. A projector that projects an image on the basis of image signals corresponding to sub-pixels which form one pixel, the projector comprising:
an image signal correcting section that corrects the image signals corresponding to the sub-pixels according to shift amounts of display sub-pixels corresponding to the sub-pixels which form a display pixel; and
a projection section that projects the image on the basis of image signals of the sub-pixels corrected by the image signal correcting section, wherein
the projection section projects the image such that a brightness of a display sub-pixel in an endmost portion of a projected image is lower than a brightness designated by a pixel value of a sub-pixel corresponding to the display sub-pixel.

9. A projector that projects an image on the basis of image signals corresponding to sub-pixels which form one pixel, the projector comprising:
an image signal correcting section that corrects the image signals corresponding to the sub-pixels according to shift amounts of display sub-pixels corresponding to the sub-pixels which form a display pixel; and
a projection section that projects the image on the basis of image signals of the sub-pixels corrected by the image signal correcting section, wherein
in sequentially performing monochrome display on the whole screen using image signals with the same pixel value for every color component corresponding to the sub-pixels, the projection section projects the image such that, for any one of the color components, a brightness of a display sub-pixel which forms a display pixel in an endmost portion of a projected image is lower than a brightness of a display sub-pixel located at an inner side than the endmost portion.

10. A method of projecting an image by a projector on the basis of image signals corresponding to sub-pixels which form one pixel, the method comprising:
acquiring an image signal corresponding to an input image;
correcting image signals corresponding to the sub-pixels, which form each pixel of the input image, on the basis of shift amounts of display positions of display sub-pixels corresponding to the sub-pixels which form a display pixel; and
projecting the image on the basis of image signals corresponding to the sub-pixels corrected in the correcting of image signals, wherein
in correcting image signals, the correction processing is performed on image signals in which dummy image signals corresponding to dummy sub-pixels, which are provided outside sub-pixels in an endmost portion of the input image, are added to input image signals of the sub-pixels.

11. The method according to claim 10, wherein
the dummy image signals have pixel values equal to or smaller than brightnesses of the sub-pixels in the endmost portion of the input image.

12. A method of projecting an image by a projector on the basis of image signals corresponding to sub-pixels which form one pixel, the method comprising:
acquiring an image signal corresponding to an input image;
correcting image signals corresponding to the sub-pixels on the basis of shift amounts of display positions of display sub-pixels corresponding to the sub-pixels which form a display pixel; and
projecting the image on the basis of image signals of the sub-pixels corrected in the correcting of image signals, wherein
in the projecting of the image, the image is displayed such that a brightness of a display sub-pixel in an endmost portion of the projected image is lower than a brightness designated by a pixel value of a sub-pixel corresponding to the display sub-pixel.

13. A method of projecting an image by a projector on the basis of image signals corresponding to sub-pixels which form one pixel, the method comprising:
correcting image signals corresponding to the sub-pixels according to shift amounts of display sub-pixels corresponding to the sub-pixels which form a display pixel; and
projecting the image on the basis of image signals of the sub-pixels corrected in the correcting of image signals, wherein
in sequentially performing monochrome display on the whole screen using image signals with the same pixel value for every color component corresponding to the sub-pixels, the image is displayed such that, for any one of the color components, a brightness of a display sub-pixel which forms a display pixel in an endmost portion of a projected image is lower than a brightness of a display sub-pixel located at an inner side than the endmost portion in the displaying of the image.

* * * * *